United States Patent
Tang et al.

[19]

[11] Patent Number: 6,098,021

[45] Date of Patent: Aug. 1, 2000

[54] ESTIMATING FORMATION STRESS USING BOREHOLE MONOPOLE AND CROSS-DIPOLE ACOUSTIC MEASUREMENTS: THEORY AND METHOD

[75] Inventors: Xiaoming Tang; Ningya Cheng, both of Sugar Land; Arthur C. H. Cheng, Houston, all of Tex.

[73] Assignee: Baker Hughes Incorporated, Houston, Tex.

[21] Appl. No.: 09/232,564

[22] Filed: Jan. 15, 1999

[51] Int. Cl.$^7$ ...................................................... G01V 1/28
[52] U.S. Cl. ................................................. 702/14; 702/16
[58] Field of Search ..................... 702/14, 16; 367/25, 367/31

[56] References Cited

U.S. PATENT DOCUMENTS

| | | | |
|---|---|---|---|
| 4,832,148 | 5/1989 | Becker et al. | 181/104 |
| 4,951,267 | 8/1990 | Chang et al. | 367/31 |
| 5,675,147 | 10/1997 | Ekstrom et al. | 250/256 |
| 5,808,963 | 9/1998 | Esmersoy | 367/31 |
| 5,831,934 | 11/1998 | Gill et al. | 367/25 |
| 5,852,262 | 12/1998 | Gill et al. | 181/106 |

*Primary Examiner*—Christine Oda
*Assistant Examiner*—Victor J. Taylor

*Attorney, Agent, or Firm*—Groover & Bachand P.C.; Kaushik P. Sriram

[57] ABSTRACT

A system and method to determine an in-situ stress field based on borehole acoustic monopole and cross-dipole measurements. A radially polarized monopole shear-wave is generated in a borehole. It is then determined whether the shear-wave has split into two shear-waves. If it has, the difference in velocities between the two split shear-waves is used to determine the stress induced anisotropy around and near the borehole. The difference in velocities of cross-dipole shear-waves and the direction of the fast shear-wave are measured and used to determine the magnitude of the maximum shear stress and the maximum stress orientation of the geologic formation. Furthermore, a method of determining the stress-velocity coupling coefficients from laboratory measurements as well as through field measurement calibration is disclosed. The effect of borehole pressure on the field measurement calibration method of determining the stress-velocity coupling coefficients is taken into account. Additionally disclosed is a method for defining a stress indicator that is related to stress-caused rock deformation. This stress indicator can be used to determine if rock failure is impending and is useful in sand control and borehole stability applications.

21 Claims, 13 Drawing Sheets

ESTIMATING FORMATION STRESS USING BOREHOLE MONOPOLE AND CROSS-DIPOLE ACOUSTIC MEASUREMENTS: THEORY AND METHOD

BACKGROUND

The present invention relates to methods for determining geologic formation information using acoustic techniques. Specifically, the present invention relates to acoustic methods for determining information about the stress field in a geologic formation.

Acoustic Wavefields

Knowledge of characteristics of geologic formations is important for many industries. Such industries include petroleum exploration and development. Many methods have been developed for gathering such information. Some of these methods of characterizing geologic formations use acoustical means to gather that information. Typically in these methods, acoustic wavefields are transmitted into the formations. Some information about the formations is based on the fact that acoustic wavefields propagate at different speeds depending on the media.

However, acoustic wavefields not only propagate at different speeds depending on the media, but also propagate through elastic media in different modes. The modes include Compressional or P-waves, wherein particle motion is in the direction of wave travel; and transverse shear or S-waves, which assuming a homogeneous, isotropic medium, may be polarized in two orthogonal directions, with motion perpendicular to the direction of wave travel. There also exist asymmetrical flexural waves as will be discussed later.

P-waves propagate through both fluids and solids. Shear-waves cannot exist in a fluid. Compressional waves propagating through the borehole fluid may be mode-converted to shear-waves in the borehole sidewall material by Snell's law of refraction provided the shear-wave velocity of that material is greater than the compressional-wave velocity of the borehole fluids. If that is not true, then shear-waves in the sidewall material can be generated only by direct excitation.

Flexural waves are bending waves. Flexural waves involve substantial displacements of particles in the medium in a direction transverse to the direction of propagation, but flexural waves can neither be classified as compressional nor as transverse. The transverse impedance (resistance to propagation of the wave) of structures carrying bending waves can be of similar magnitude to that of sound waves in the adjacent fluid, thereby facilitating energy exchange between the two media.

Among other parameters, the various modes of propagation are distinguishable by their relative velocities. The velocity of compressional and transverse shear-waves is a function of the elastic constants and the density of the medium through which the waves travel. The S-wave velocity is, for practical purposes, about half that of P-waves. Compressional wavefields propagating through the borehole fluid are usually slower than formational shear-waves but for boreholes drilled into certain types of soft formations, the borehole fluid velocity may be greater than the sidewall formation S-wave velocity. The velocity of flexural waves is said to approach the S-wave velocity as an inverse function of the acoustic excitation frequency. Some authors refer to flexural waves as dipole shear-waves.

Acoustic Logging Tools

Acoustic logging tools for measuring properties of the sidewall material of both cased and uncased boreholes are well known. Essentially, such tools measure the travel time of an acoustic pulse propagating through the sidewall material over a known distance. In some studies, the amplitude and frequency of the acoustic pulse, after passage through the earth, are of interest.

In its simplest form, an acoustic logger consists of one or more transmitter transducers that periodically emit an acoustic pulse into the formation around the borehole. One or more receiver transducers, spaced apart by a known distance from the transmitter, detects the pulse after passage through the surrounding formation. The difference in time between pulse transmission and pulse reception divided into the distance between the transducers is the formation velocity. If the transducers do not contact the borehole sidewall, allowance must be made for time delays through the borehole fluid.

Acoustic Monopole/Dipole Well Logging Instruments

Acoustic monopole/dipole well logging instruments are used, among other purposes, for making measurements related to the shear propagation velocity and the compressional propagation velocity of earth formations penetrated by a wellbore. An acoustic well logging tool is generally cylindrically shaped and suitably sized for passage through a fluid filled well bore. Normally, the tool carries two or more transducers which are disposed and secured at a fixed distance from one another. In a typical acoustic tool an array of transducers serve as transmitters of sound waves while another array of transducers serve as receivers of sound waves. The receivers are spaced from one another at a predetermined distance and are disposed to one side of the transmitter along the longitudinal axis of the tool. In operation, the transmitter in the tool is electrically actuated periodically to emit pulses of acoustic energy (or pressure waves) which propagate outwardly from the transmitter with a velocity dependent upon the media traversed by the energy. The arrival of the acoustic energy at the successively positioned receivers is detected to trigger electrical circuits in the tool which function to ascertain a characteristic of the formation from the pulse of acoustic energy traveling the predetermined distance between the array receivers.

In a typical well bore, an acoustic tool is commonly spaced from the wall of the well bore so that the emitted acoustic wave energy or pressure pulses are first omnidirectionally (monopole) or unidirectionally (dipole) transmitted through fluid (usually mud) in the well bore and, after traveling through the fluid over the distance from the tool to the wall of the well bore, a portion of the traveling wave energy is transmitted to adjacent media surrounding the well bore. The characteristic velocity of wave motion or the wave energy through the fluids in the well is generally in the neighborhood of 5000 feet per second, while the characteristic velocity of wave motion through the adjacent media may vary from 5000 feet per second to 25,000 feet per second for compressional waves depending upon the type of media encountered. Other wave types have similar properties.

The portion of the acoustic wave energy transmitted into the media generally travels at a higher velocity than the corresponding portion of the wave energy traveling in the well bore fluid. Because of this, the portion of the wave energy traveling through media reaches a receiver prior to the time that the portion of the acoustic wave energy traveling through the fluids does. It is this feature of higher media velocity which permits measurement of the velocity of acoustic energy in the media surrounding a well bore.

Formation Stress Field

Detailed information regarding the formation stress field is very important for oil field operations. Stress controls the integrity/stability of rock formations of finite strength. Thus knowing the stress orientation and magnitude will help design drilling programs to avoid borehole instability or collapse. In reservoir engineering, knowing that stress will or will not cause borehole instability helps in making the decision of whether or not an expensive treatment (such as gravel packing) is necessary. Furthermore, knowledge of stress helps find the hydraulic fracture direction and helps determine the fluid flow direction in the reservoir. These are only a few examples illustrating the importance of knowing the formation stress field.

Traditionally, the measurement of in-situ stress has been performed using a borehole packer and microfracture test. This method is usually time-consuming and expensive. Determination of an in-situ stress field based on borehole acoustic measurements would provide a fast and inexpensive way of gathering detailed information for the formation stress field.

One proposed method for using acoustic measurements to determine information about the formation stress field is described by U.S. Pat. No. 4,641,520 issued to Mao. In the method of Mao, in-situ stresses are determined by measuring stress-induced shear-wave velocity anisotropy around and near a borehole using acoustic shear-waves. An estimation of the stress field is based on the fact that the difference between two shear-wave velocities is proportional to the stress difference in the two directions of particle motion.

Another proposed method for using acoustic measurements to determine information about the formation stress field is described by U.S. Pat. No. 5,298,215 issued to Sinha et al. In this method, low and high frequency flexural waves are generated with dipole transducers. From measurements made at receiving transducers which are oriented at two orthogonal directions in a horizontal plane normal to the borehole axis, and via known processing techniques, the received signals are transformed into arrivals as a function of frequency such that the principal polarization directions and the magnitudes of the maximum and minimum wave velocities at those directions are determined at different frequencies. Determination of whether uniaxial stress in the formation is attributed to stress induced azimuthal anisotropy (differences in the orientation of parameters such as permeability that vary angularly around the borehole that results from stress) as opposed to an intrinsic anisotropy (anisotropy that is intrinsic to the formation and not a result of stress) in the formation is deduced from comparison of the directions of the maximum and minimum shear-wave velocities of the low and high frequency waves. Then, the low frequency information is utilized to obtain values for a formation shear stress parameter.

Both of these techniques are based on the stress effect on shear-wave velocities. The technique of Mao uses a linear relation between stress and velocity while the technique of Sinha et al. utilizes a nonlinear relation for the stress and velocity. However, both of these techniques have substantial drawbacks. Some of the drawbacks of the technique of Mao are the fact that only velocity changes around and near the borehole are measured and the fact that the stress-velocity coupling coefficients are unknown parameters in the relation. Some of the drawbacks of the technique of Sinha et al. are the fact that it requires determining the nonlinear elastic constants and that it detects the stress-induced anisotropy using the cross-over phenomenon of the fast and slow dipole-shear-wave dispersion curves at high frequencies. This cross-over phenomenon may be difficult to observe for commonly observed anisotropy values of only a few percent. Furthermore, in both techniques, the influence of borehole pressure on the formation shear velocity is not considered. as will be shown, this pressure can significantly affect monopole shear-waves that can be used to identify the stress-induced anisotropy.

SUMMARY OF THE INVENTION

The present application discloses a system and method to determine an in-situ stress field based on borehole acoustic monopole and cross-dipole measurements. A radially polarized monopole guided shear-wave is generated in a borehole. It is then determined whether the shear-wave has split into two shear-waves. If it has, the difference in velocities between the two split shear-waves is used to determine the stress induced anisotropy around and near the borehole. The difference in velocities of cross-dipole shear-waves and the direction of the fast shear-wave are measured and used to determine the magnitude of the maximum shear stress and the maximum stress orientation of the geologic formation. The present application also discloses a method of determining the stress-velocity coupling coefficients from laboratory measurements as well as through field measurement calibration. The effect of borehole pressure on the field measurement calibration method of determining the stress-velocity coupling coefficients is taken into account. The present application additionally discloses a method for defining a stress indicator that is related to stress-caused rock deformation and can be used to determine if rock failure is impending. This is important because rock failure can cause the borehole to collapse trapping the drill stem and creating the need to redrill the borehole. The disclosed innovations, in various embodiments, provide one or more of at least the following advantages: provides a fast and inexpensive way to determine an in-situ stress field of a geologic formation, provides a better method to determine information about geologic formations than prior methods because the effects of borehole pressure on shear-wave velocities is taken into account.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 1:
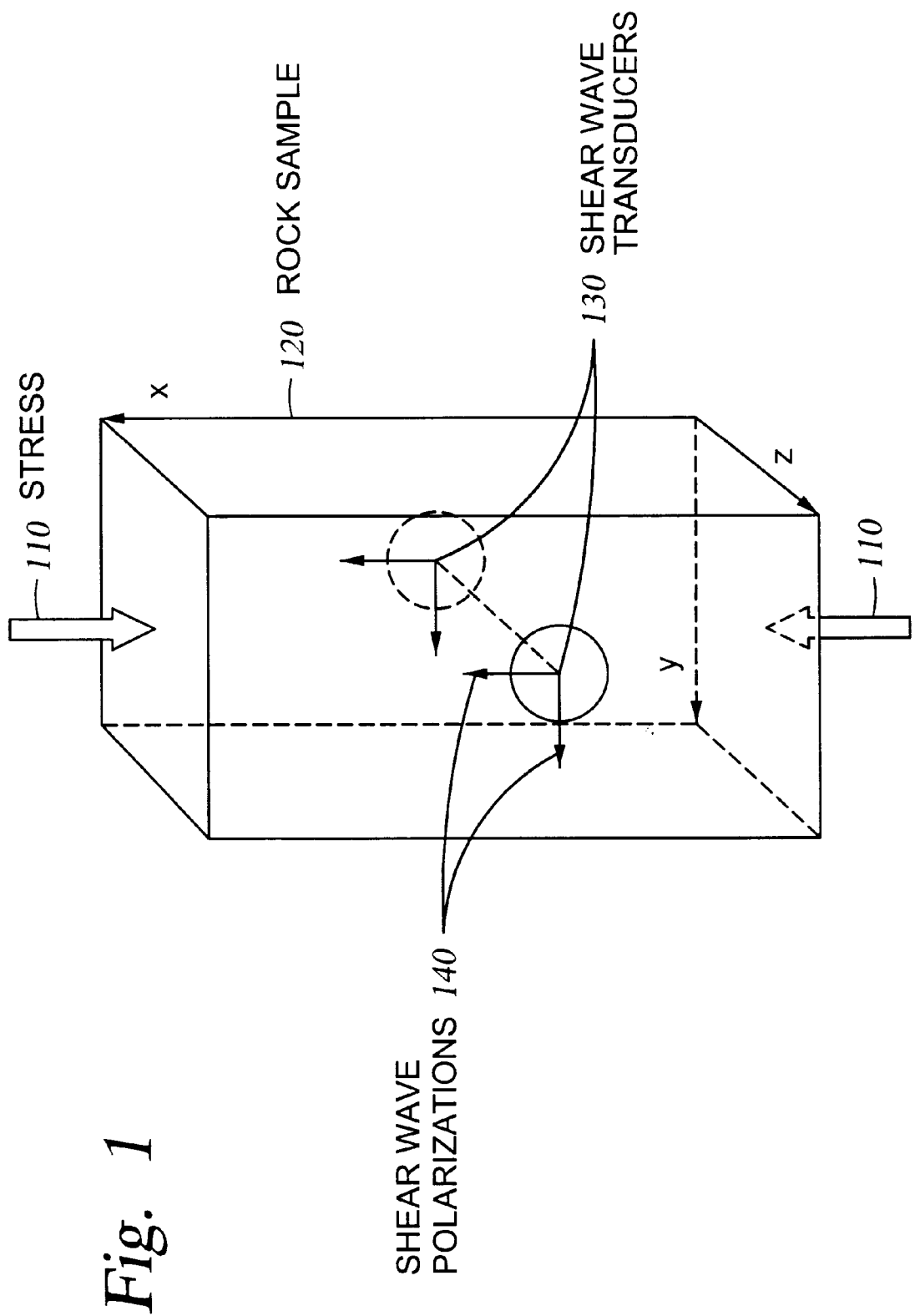
FIG. 1 shows a laboratory configuration for measuring stress-induced shear-wave anisotropy.

The numerous innovative teachings of the present application will be described with particular reference to the presently preferred embodiment (by way of example, and not of limitation).

Definitions:

Following are short definitions of the usual meanings of some of the technical terms which are used in the present application. (However, those of ordinary skill will recognize whether the context requires a different meaning.) Additional definitions can be found in the standard technical dictionaries and journals.

velocity: unless otherwise qualified in the disclosure, velocity shall mean the velocity of an acoustic wavefield through a medium, not the velocity of the motion of the medium itself.

borehole: a deep narrow circular hole, especially one made in the earth to find water, oil, etc.

isotropic: having the same physical properties in all directions.

anisotropic: having physical properties that are different in different directions, e.g. the strength of wood along the grain differing from that across the grain.

borehole acoustic monopole: an acoustic wave that propagates along the borehole and whose associated particle motion (e.g., polarization) is axisymmetric with respect to the borehole.

borehole acoustic dipole: an acoustic wave that propagates along the borehole and whose associated particle motion (e.g., polarization) is primarily in one direction that is perpendicular to the borehole.

formation (or rock formation): earth strata of a particular type of rock or a combination of different rocks surrounding a borehole.

cross-dipole: two dipoles whose directions of polarization are at right angles to each other.

azimuth: the angular distance away from the x-axis in the xy plane which is perpendicular to vertical.

azimuthal: of or relating to the azimuth.

shear-wave: an acoustic wave in which the direction of particle motion is perpendicular to the direction of the wave propagation.

compression wave: an acoustic wave in which the direction of particle motion is parallel to the direction of the wave propagation.

Overview

The present application describes a simple but effective method for determining the formation stress field using borehole acoustic monopole and cross-dipole measurements. This method is based on a linear stress-velocity relation. Testing this relation using published laboratory data not only validates the relation, but also determines the essential parameters required by the relation. Application of the stress-velocity relation to the borehole environment results in a theory that describes the stress-induced shear velocity variation around the borehole. This theory can satisfactorily describe the stress-induced effects on monopole and dipole acoustic waves, providing a solid basis for determining stress-induced shear-wave anisotropy using borehole acoustic measurements.

Numerical modeling demonstrates that the two principal stresses perpendicular to the borehole produce a splitting in the cross-dipole measured dipole-shear-wave data. They also produce an even greater splitting in the monopole-shear-wave data. The latter splitting provides a criterion to verify whether or not the determined anisotropy is caused by the stress field. Thus, by combining the two measurements, one can detect the stress-induced shear-wave anisotropy and estimate both the orientation of, and the difference between, the two principal stresses. Furthermore, using a cross-dipole measurement, one can define a stress indicator that is related to rock deformation and formation shear stress magnitude. This indicator may be used to indicate impending rock failure or yield, thus being potentially useful in sand control and borehole stability applications.

A field data example is shown to demonstrate the application of the method. This data set shows that stress-induced shear-wave velocity change and anisotropy are significant in sand but negligible in shale, consistent with the laboratory testing results. Applying the proposed method to the acoustic logging data yields the maximum stress orientation and the shear stress magnitude.

Stress-Velocity Relation: An Evaluation Using Laboratory Data

Consider a biaxial loading situation where two orthogonal principal stresses $\sigma_x$ and $\sigma_y$ are acting in the x- and y-directions, respectively. The propagation direction of a shear-wave is in the z-direction. The propagation velocity of the shear-wave that polarizes in the x- and y-directions is given respectively by the following stress-velocity relation (Mao, N. H., U.S. Pat. No. 4,641,520)

$$v_x^2 = v_{0x}^2 + S_{//}\sigma_x + S_{\perp}\sigma_y \tag{1}$$

$$v_y^2 = v_{0y}^2 + S_{\perp}\sigma_x + S_{//}\sigma_y \tag{2}$$

where $S_{//}$ is the stress-velocity coupling coefficient for a stress that is parallel to the shear-wave polarization direction and $S_{\perp}$ is the cross-coupling coefficient for a stress perpendicular to the polarization direction; $v_{0x}$ and $v_{0y}$ are the unstressed shear-wave velocity for the x- and y-polarization directions, respectively. Intrinsic anisotropy exists if $v_{0x}$ and $v_{0y}$ are not equal. Equations (1) and (2) provide a simple linear relation to describe the stress-induced shear-wave velocity changes. It is very important to demonstrate that this relation is applicable to real rocks before applying it to the formation stress evaluation problem. Laboratory data will be used to test the relation. A method for determining the coupling coefficients in equations (1) and (2) will also be provided.

In the laboratory, the coupling coefficients $S_{//}$ and $S_{\perp}$ of a rock sample can be determined from a shear-wave velocity measurement under uniaxial loading. In the setup shown in FIG. 1, an uniaxial stress $\sigma_x$ 110 is applied to the sample 120 in the x-direction. (Although shown as a block like structure, the sample does not have to have this shape, but can have other shapes such as cylindrical. However, if other shapes of samples are used, the shear transducer must be shaped to couple well with the surface of that shape.) Shear-wave transmitter and receiver transducers 130 facing the z-direction are mounted at the opposite sides of the sample. The shear-wave velocity is measured at two polarization directions 140: one in the x-direction and the other in the y-direction, both being perpendicular to the applied stress. For this configuration, equations (1) and (2) reduce to $$v_x^2 - v_{0x}^2 = S_{//} \sigma_x \tag{3}$$

$$v_y^2 - v_{0y}^2 = S_\perp \sigma_x \tag{4}$$

If the velocities $v_x$ and $v_y$ are measured for a range of $\sigma_x$ values, then the coefficients $S_{//}$ and $S_\perp$ can be determined by linearly fitting the $v_x^2 - v_{0x}^2$ versus $\sigma_x$ and $v_y^2 - v_{0y}^2$ versus ax data, respectively. The published laboratory data of Rai, C. S. and Hanson, K. E., "Shear-wave velocity anisotropy in sedimentary rocks: A laboratory study," Geophysics, 53, 800–806 (1987) is used to demonstrate the method.

Figure 2:
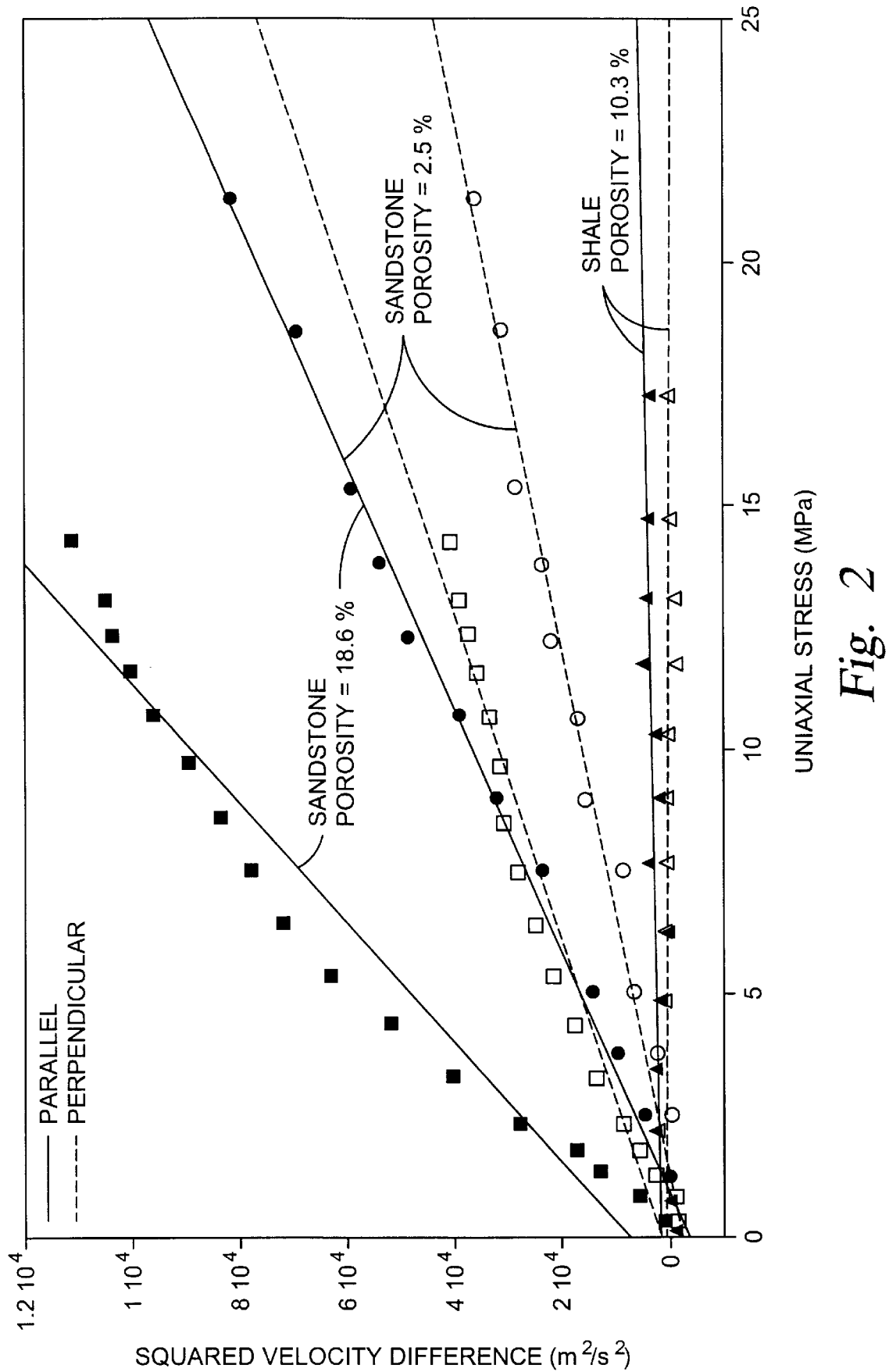
FIG. 2 shows a graph testing the stress-velocity coupling relation and determining the coupling coefficients using the laboratory data of Rai and Hanson (1987).

FIG. 2 shows the measured squared shear velocity difference versus uniaxial stress for three different sedimentary rocks. The first is a sandstone rock of 2.5% porosity {solid (parallel) and open (perpendicular) circles}. With increasing stress, there is clearly a linear relationship between the squared velocities and stress, as described by equations (3) and (4). Linearly fitting the data versus stress and evaluating the slope of the fitted lines give $S_{//}=40,414$ m$^2$/s$^2$MPa and $S_\perp=18,663$ m$^2$/s$^2$MPa for this sandstone rock. One notices that $S_{//}$ is at least a factor of two greater than $S_\perp$, meaning that stress produces a much greater velocity change parallel to the wave polarization direction than perpendicular to it. The same conclusion can also be drawn from the laboratory results of Nur, A., and Simmons, G., "Stress-induced velocity anisotropy in rock: An experimental study," Jour. Geoph. Res., 72, 6667–6674 (1969), although their measurement was made with a different configuration.

The second data set is for a sandstone of 18.6% porosity {solid (parallel) and open (perpendicular) squares}. Using the same method as before, $S_{//}=89,213$ m$^2$/s$^2$MPa and $S_\perp=31,867$ m$^2$/s$^2$MPa are determined. These values are much larger than the sandstone with 2.5% porosity, indicating that stress produces a greater velocity change on rocks with more imperfections (pores, cracks, etc.) than on rocks with fewer imperfections. Again, $S_{//}$ is much greater than $S_\perp$. The fit to the parallel data shows some deviation from the linear theory {nonlinear effects, as described by Sinha, B. K. and Kostek, S., U.S. Pat. No. 5,398,215 theory}. Nevertheless, the theory fits the data reasonably well as a first order approximation.

The third data set is for a shale sample with 10.3% porosity {solid (parallel) and open (perpendicular) triangles}. This sample exhibits strong shear-wave transverse anisotropy between z- and x- (or y-) directions (Rai and Hanson, 1987). Surprisingly, there is very little stress-dependent anisotropy between x- and y-directions as well as stress-induced velocity changes, as shown in FIG. 2. The estimated $S_{//}=1,850$ m$^2$/s$^2$MPa and $S_\perp=-1,600$ m$^2$/s$^2$MPa. Compared to the previous two examples, these two stress-velocity coupling coefficients are quite small. This result suggests that the stress-induced azimuthal anisotropy in shales is insignificant. As will be shown later, this result is very important in interpreting cross-dipole anisotropy logs in sand-shale formations.

The evaluation of the linear stress-velocity relationship using laboratory data not only validates the theory but also provides a method for determining the coupling coefficients. It also shows that the stress-velocity coupling effect is greater in rocks with high porosity and/or crack density than in rocks with low porosity/crack density. In particular, it has been seen that this effect is insignificant in shale. Having established the validity of the stress-velocity relation {equations (1) and (2)}, these equations are applied to investigate the stress-induced velocity variation around a borehole, as will be discussed in the following section.

A Theory for Stress-Induced Shear-wave Velocity Variation Around a Borehole

In this section a simple and effective theory for stress-induced shear-wave velocity changes around a borehole is described. Besides using the stress-velocity relation, the essence of the theory is the decomposition of the stress field and the resulting velocity changes into azimuthally isotropic and anisotropic components. Consequently, many borehole and formation stress scenarios, such as a pressurized borehole, unbalanced formation stresses, etc., can be effectively modeled. Consider a fluid-filled borehole configuration shown in FIG. 3, with the borehole axis in the vertical direction. There are three stresses acting in and around the borehole: p, $\sigma_x$, and $\sigma_y$, where p is the fluid pressure inside the borehole, and $\sigma_x$ and $\sigma_y$ are the two principal stresses in the x- and y-directions, respectively. In terms of p, $\sigma_x$, and $\sigma_y$, the formation radial ($\sigma_r$), tangential ($\sigma_\theta$), and shear ($\sigma_{r\theta}$) stresses can be expressed as (Jaeger, J. C., and Cook, N. G. W., *Fundamentals of Rock Mechanics*, Halsted Press, 1977)

$$\sigma_r = \frac{\sigma_x + \sigma_y}{2}\left(1 - \frac{R^2}{r^2}\right) + \frac{pR^2}{r^2} + \frac{\sigma_x - \sigma_y}{2}\left(1 + 3\frac{R^4}{r^4} - 4\frac{R^2}{r^2}\right)\cos 2\theta \tag{5}$$

$$\sigma_\theta = \frac{\sigma_x + \sigma_y}{2}\left(1 + \frac{R^2}{r^2}\right) - \frac{pR^2}{r^2} - \frac{\sigma_x - \sigma_y}{2}\left(1 + 3\frac{R^4}{r^4}\right)\cos 2\theta \tag{6}$$

$$\sigma_{r\theta} = -\frac{\sigma_x - \sigma_y}{2}\left(1 - 3\frac{R^4}{r^4} + 2\frac{R^2}{r^2}\right)\sin 2\theta \tag{7}$$

where $\theta$ is the angle from the x-direction, r is the radial distance and R is the borehole radius.

With the given stress-velocity relation {equations (1) and (2)} and the stress field {equations (5), (6), and (7)}, the stress-induced velocity variations around the borehole are described. Two types of variations with respect to azimuth need to be clarified: isotropic and anisotropic. The isotropic variation is independent of azimuth $\theta$ while the anisotropic variation changes with $\theta$. Accordingly, the stress elements in equations (5) through (7) are decomposed into azimuthally isotropic and anisotropic components, as $$\sigma_r = \sigma_r^{iso} + \sigma_r^{ani} \tag{8}$$

$$\sigma_\theta = \sigma_\theta^{iso} + \sigma_\theta^{ani} \tag{9}$$

$$\sigma_{r\theta} = 0 + \sigma_{r\theta}^{ani} \tag{10}$$

where the superscripts iso and ani denote isotropic and anisotropic components, respectively. The first two terms of equation (5) and equation (6) correspond to $\sigma_r^{iso}$ and $\sigma_\theta^{iso}$, while the last term of these two equations corresponds to $\sigma_r^{ani}$ and $\sigma_\theta^{ani}$, respectively. The isotropic component of $\sigma_{r\theta}$ is zero. Note the anisotropic stress components are controlled by the stress difference $\sigma_x - \sigma_y$.

The stress-velocity relation {equations (1) and (2)} is now applied to the isotropic components. The stresses in this relation are principal stresses. For the azimuthally isotropic stresses, the radial and tangential stresses are already the principle stresses. For monopole and dipole acoustic measurements, the shear-wave polarization is primarily in the radial direction that is parallel to $\sigma_r^{iso}$. The resulting shear velocity is therefore given by $$v_{iso}^2(r) = v_0^2 + S_{//}\sigma_r^{iso} + S_\perp \sigma_\theta^{iso} \qquad (11)$$

where $v_0$ is the unstressed formation shear velocity. The shear velocity in equation (11) is a function of radial distance only. It is controlled by the average formation stress $(\sigma_x + \sigma_y)/2$ and borehole pressure p {see equations (5) and (6)}. In the previously mentioned techniques, the borehole pressure effect was not considered. As will be seen later, the borehole pressure contributes to the near borehole shear velocity changes and thus affects the monopole shear-waves that are sensitive to the near borehole changes.

Let us consider the anisotropic stress components. The principal directions of this stress system are in the x- and y-directions, at which the shear stress vanishes. To apply the stress-velocity relation, these stress components need to be rotated to their principal directions using the following equations:

$$\sigma_{xx}^{ani} = \sigma_r^{ani} \cos^2\theta - \sigma_{r\theta}^{ani} \sin 2\theta + \sigma_\theta^{ani} \sin^2\theta \qquad (12)$$

$$\sigma_{yy}^{ani} = \sigma_r^{ani} \sin^2\theta + \sigma_{r\theta}^{ani} \sin 2\theta + \sigma_\theta^{ani} \cos^2\theta \qquad (13)$$

The "unstressed" velocity for the present situation also needs to be defined. Because the isotropic velocity in equations (11) is independent of the anisotropic stresses, this velocity is now defined as the unstressed velocity for the anisotropic stress field. This way, the effects of the isotropic and anisotropic stress systems are combined. Using the stress-velocity relation, the velocities of a shear-wave that polarizes to the x- and y-directions are given by $$v_x^2(r,\theta) = v_{iso}^2 + S_{//}\sigma_{xx}^{ani} + S_\perp \sigma_{yy}^{ani} \qquad (14)$$

$$v_y^2(r,\theta) = v_{iso}^2 + S_\perp \sigma_{xx}^{ani} + S_{//}\sigma_{yy}^{ani} \qquad (15)$$

Equations (14) and (15) define a special kind of elastic wave anisotropy called transverse isotropy (TI), which is the simplest model to describe the different propagation characteristics for shear-waves polarized at two orthogonal directions, e.g., x and y. The symmetry axis of this TI medium is along the x-direction (i.e., the maximum stress direction). The TI medium has 5 elastic moduli $C_{11}$, $C_{12}$, $C_{13}$, $C_{44}$, and $C_{66}$, of which the last two, i.e., $C_{44}$ and $C_{66}$, are of primary importance for shear-wave propagation (e.g., White, J. E., *Underground Sound*, Elsevier Science Publishing Company, Inc. 1983). Using equations (14) and (15), these two moduli are given as:

$$C_{66} = \rho v_x^2(r,\theta) \qquad (16)$$

$$C_{66} = \rho v_y^2(r,\theta) \qquad (17)$$

where $\rho$ is formation density. The remaining moduli are calculated as $C_{12} = C_{13} = C_{11} - 2C_{66}$ and $C_{11} = \rho v_p^2$, where $v_p$ is the compressional wave velocity which can be set to a proper value because shear-waves are the main concern. When using equations (16) and (17) to model the azimuthal anisotropy around a borehole, the borehole axis is taken as the z-direction that is perpendicular to the xy plane.

Equations (16) and (17) must satisfy a necessary physical condition. That is, the anisotropic formation shear-wave properties they describe must become isotropic when the formation stresses are balanced, i.e., $\sigma_x = \sigma_y \Rightarrow C_{44} = C_{66}$. This can be easily verified using equations (14) and (15) since the anisotropic stress field vanishes when $\sigma_x = \sigma_y$. It is this physical condition that leads to the decomposition of the stress and velocity fields into isotropic and anisotropic components. {This condition will not be satisfied if one rotates directly the total stresses in equations (5) through (7) to the principal directions and use the rotated stresses to replace $\sigma_{xx}^{ani}$ and $\sigma_{yy}^{ani}$ in equations (14) and (15)}.

Figure 3:
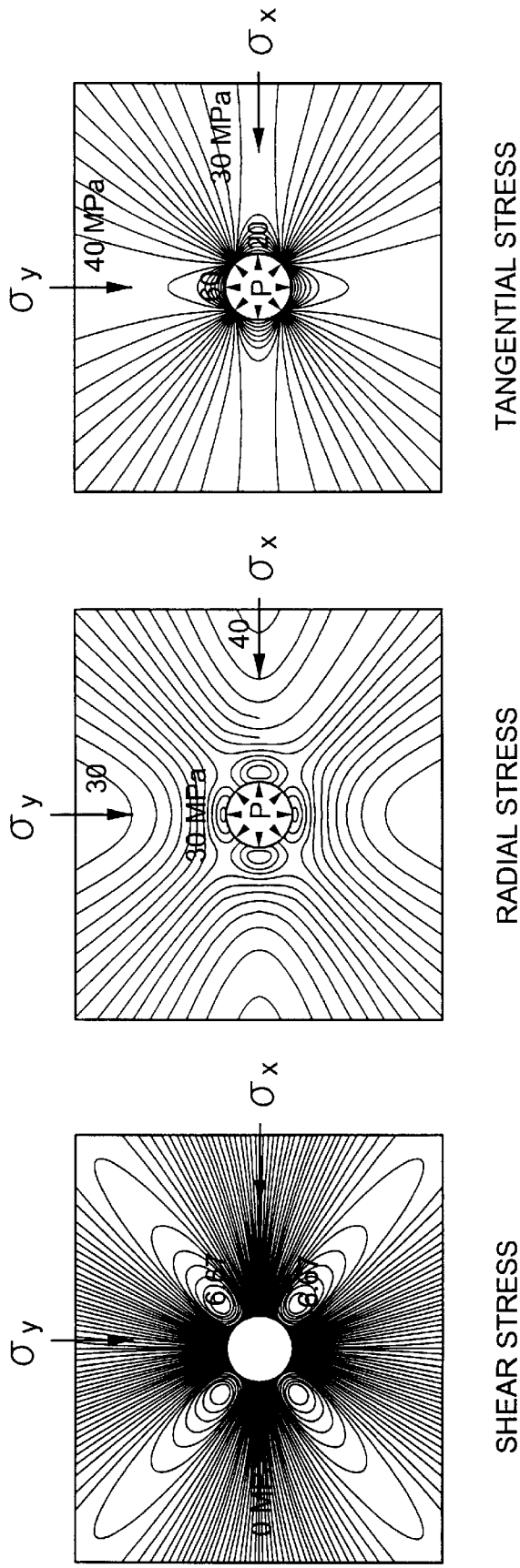
FIG. 3A shows radial, shear, and tangential stress variations (shown as contours) around a borehole.
Figure 4:
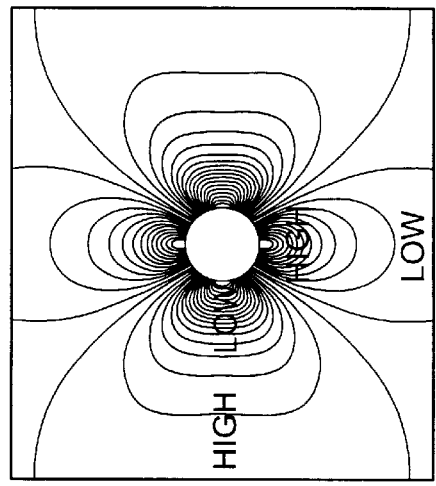
FIG. 4A shows a graph of shear moduli (shown as contours) around a borehole due to formation and borehole stresses.
Figure 4:
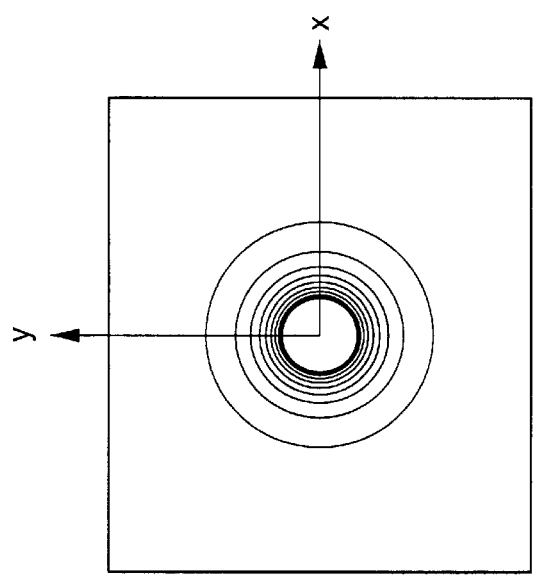
Figure 4:
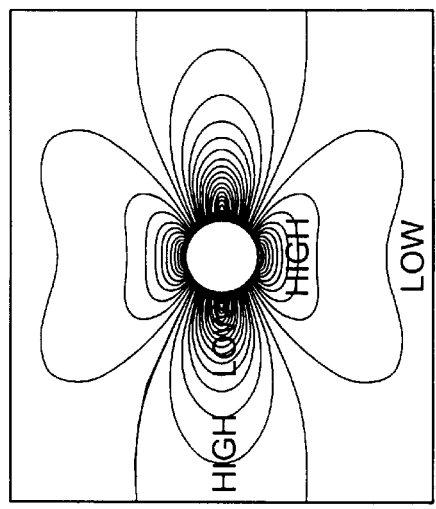
Figure 5:
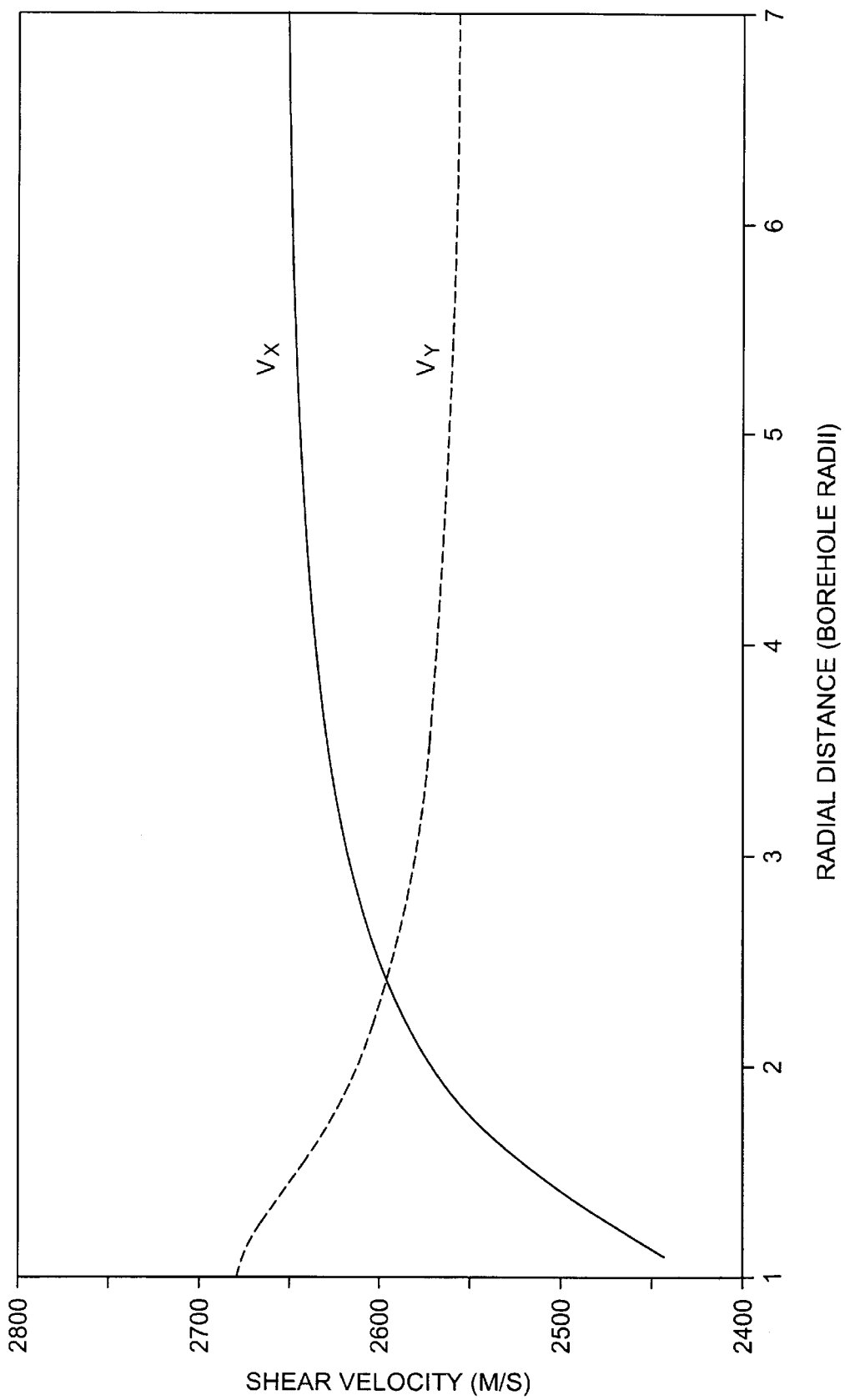
FIG. 5 shows a graph of shear velocity profiles for polarization along the maximum stress and minimum stress directions.

Equations (16) and (17) define a medium that is both anisotropic and inhomogeneous, because the velocities given by equations (14) and (15) change with r and θ. To illustrate the stress-induced shear modulus (or velocity) variation around the borehole, formation stresses {equations (5), (6), and (7)}, and the isotropic {equations (11)} and anisotropic {equation (14) and (15)} velocities are numerically evaluated to calculate the shear moduli. FIGS. 3 shows the radial, shear, and tangential stress distributions around the borehole for p=30 MPa, $\sigma_x$=40 MPa, and $\sigma_y$=30 MPa. FIGS. 4 shows the resulting isotropic {$C_{iso} = \rho v_{iso}^2$, where $v_{iso}$ is given in equation (11)}, and anisotropic ($C_{44}$ and $C_{66}$) shear modulus distributions around the borehole, where $S_{//}$=89,213 m²/s²MPa and $S_\perp$=31,867 m²/s²MPa are used as determined from a sandstone of 18.6% porosity (FIG. 2). As can be expected, $C_{iso}$ changes only radially around the borehole, while $C_{44}$ and $C_{66}$ change significantly with azimuth. A very interesting feature in the $C_{44}$ and $C_{66}$ variations is that along the x-direction the shear moduli are lower near the borehole and becomes higher about 1–2 radii away from the borehole, while for the y-direction they are higher near the borehole and become lower away from the borehole. This shear modulus or velocity variation characteristics is simply due to the stress concentration in the near borehole region. To demonstrate the near- and far-borehole characteristics, one calculates $v_x$ along the x-axis, and $v_y$ along the y-axis using equations (14) and (15). The results are shown in FIG. 5. The cross-over of the two velocities is clearly seen. For this example, $v_x$ is about 10% lower than $v_y$ at the borehole, but becomes 4% higher than $v_y$ at 7 radii from the borehole. The distance where $v_x$ and $v_y$ are equal, as shown in FIG. 5, defines approximately the boundary between near- and far-borehole regions. The characteristics of the shear velocity distributions has very important implications for acoustic measurements in a borehole.

Characterizing and Estimating Formation Stress Using Borehole Acoustic Measurements The stress-induced velocity variation around the borehole produce measurable effects on the monopole and dipole/cross-dipole acoustic logging data. Conversely, these measured effects allow us to estimate the stress field information. In the following, the influence of the velocity distributions {equations (14) and (15)} on dipole and monopole acoustic waves are discussed. It will be demonstrated that a cross-dipole anisotropy measurement can determine the orientation of the principal stresses and their difference and that a monopole shear-wave measurement can distinguish the stress-induced anisotropy among various sources of formation anisotropy.

Figure 6:
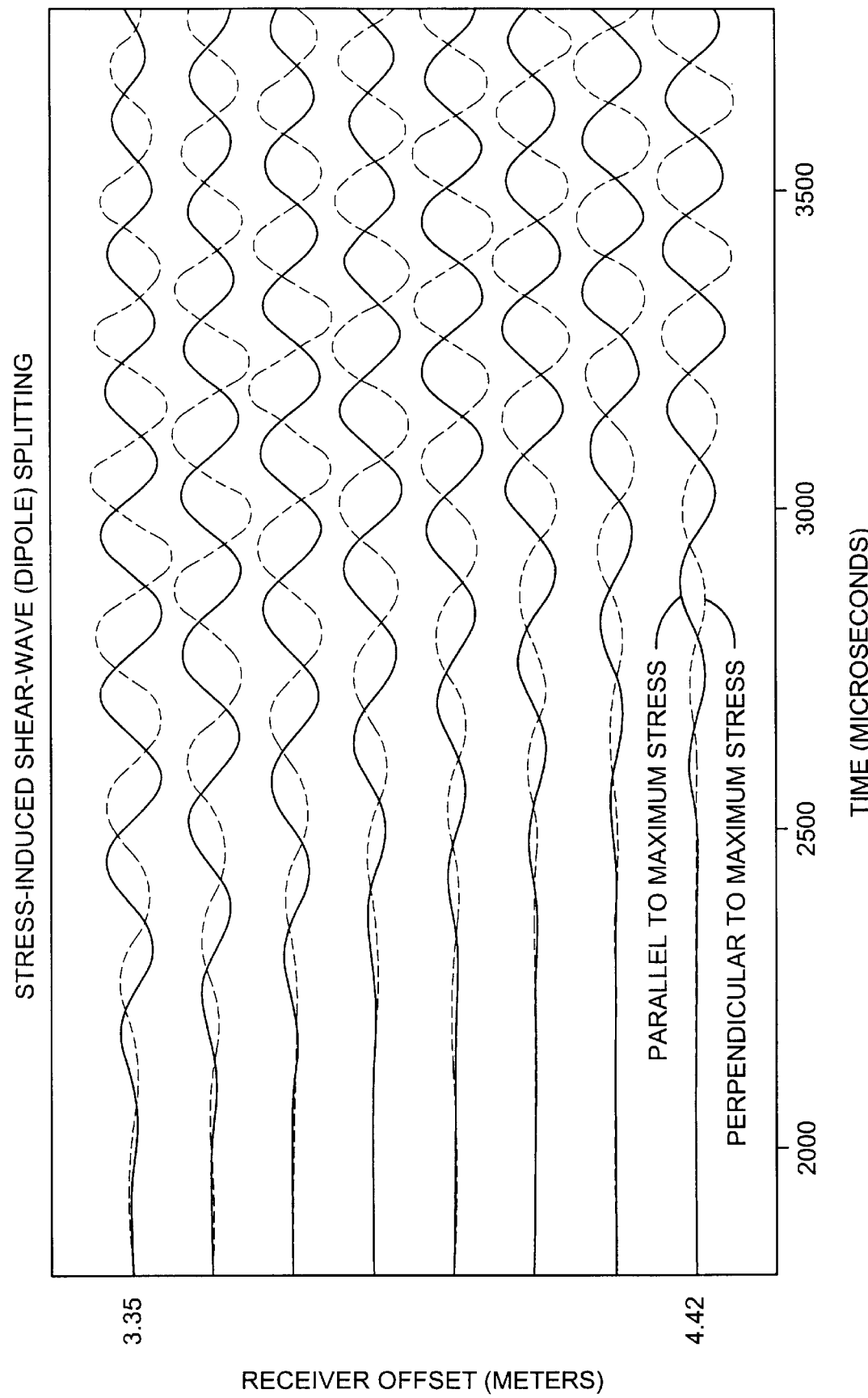
FIG. 6 shows a graph of stress-induced dipole shear-wave splitting obtained using finite difference wave simulation on the anisotropic stress-velocity model.

Now consider the stress-induced shear-wave anisotropy measured by a cross-dipole acoustic tool. This tool consists of two directional dipole transmitter and receiver systems that are pointed 90 degrees apart (Patterson, D. and Shell, G., "Integration of Cross-dipole Acoustics for Improved formation Evaluation," Paper E, in 38$^{th}$ Annual Meeting Transactions: Society of Professional Well Log Analysts, 1996). The dipole tool, being a low-frequency sounding device, can penetrate deep into the formation. According to equations (5) and (6) (see also FIG. 4), the r-dependent terms rapidly diminish at 2~3 borehole radius distances. This shows that a low-frequency dipole pointing to the x- and y-directions will measure, respectively, two velocities given by $$V_x^2 \approx v_x^2(\infty, 0) = v_0^2 + S_{//}\sigma_x + S_\perp \sigma_y \qquad (18)$$

$$V_y^2 \approx v_y^2(\infty, 90°) = v_0^2 + S_\perp \sigma_x + S_{//}\sigma_y \qquad (19)$$

where $v_x^2$ and $v_y^2$ are given in equations (14) and (15), respectively. Considering the fact that $\sigma_x > \sigma_y$ and $S_{//} > S_\perp$ (see FIG. 2), one can immediately conclude that $V_x > V_y$ This indicates that away from the borehole the low-frequency dipole tool will measure a faster velocity along the maximum stress direction than along the minimum stress direction. The above analysis result is verified with numerical finite difference simulations using the technique developed by Cheng et al., "Borehole Wave Propagation in three Dimensions," J. Acoust. Soc. Am., 97, 3483–3493 (1995). Using the anisotropic stress-velocity model {equations (14) through (17)}, the dipole array waveforms are computed for two polarizations along the x- and y-directions, respectively. Refer to FIG. 5 for the model characteristics. In the current model, $v_x$ is 16.8% lower than $v_y$ at the borehole and becomes 6.8% higher than $v_y$ far from the borehole. The wave center frequency in the modeling is around 3.5 kHz. FIG. 6 shows the modeling result. The waves pointing to the x- (maximum stress) direction (solid curves) indeed travel faster than the waves pointing to the y- (minimum stress) direction (dashed curves), despite the complicated near-borehole variations of the anisotropic velocities (e.g., FIGS. 4 and 5). The splitting of the fast and slow waves in FIG. 6 gives the measure of anisotropy, which is almost exactly the far field value of 6.8%. The velocity difference for shear-wave polarization at two orthogonal stress directions is called "stress-induced shear-wave anisotropy". This is an important result that forms the basis for determining stress-induced anisotropy using cross-dipole acoustic logging.

With the recent advances in cross-dipole logging technology (Joyce et al., "Advanced Interpretation of Fractured Carbonate Reservoirs Using Four-component cross-dipole Analysis," Paper R, in $39^{th}$ Annual Meeting Transactions: Society of Professional Well Log Analysts, 1998) and processing techniques (as described by U.S. Pat. No. 5,712,829 issued to Tang and Chunduru, or Tang, X. M. and Chunduru, R. K., "Simultaneous Inversion of Formation Shear-wave Anisotropy Parameters from Cross-dipole Array Acoustic Waveform Data," Geophysics, in press, 1998), formation azimuthal anisotropy can be reliably determined. The cross-dipole measurement gives the fast shear-wave polarization direction and fast and slow shear velocities $V_x$ and $V_y$. For a stress-induced anisotropy, the result y of this study shows that the cross-dipole measurement determines the maximum stress direction as the fast shear-wave polarization direction, and finds the fast and slow velocities along the maximum and minimum stress directions. These two velocities are given by equations (18) and (19), respectively. These two equations allow us to determine the magnitude of the difference between the maximum and minimum principal stresses perpendicular to the borehole. By differencing equations (18) and (19), one obtains $$\sigma_x - \sigma_y = \frac{V_x^2 - V_y^2}{S_{//} - S_\perp} \quad (20)$$

This result shows that the stress difference is directly proportional to the measured velocity difference (or anisotropy), and the proportionality constant is the inverse of the parallel and perpendicular coupling coefficient difference. An immediate application of equation (20) is to use it to interpret the stress-induced anisotropy from cross-dipole measurement results. According to Tang and Chunduru (1998), the azimuthal shear anisotropy is defined as $$\gamma = \frac{(V_x - V_y)}{\overline{V}}, \text{ with } \overline{V} = (V_x + V_y)/2 \text{ and } V_x \geq V_y \quad (21)$$

Using equations (20) and (21), a formation stress indicator is defined as follows:

$$(S_{//} - S_\perp)(\sigma_x - \sigma_y) = 2(S_{//} - S_\perp)\tau_{max} = \frac{\gamma \overline{V}^2}{2}, \quad (22)$$

where $\tau_{max} = (\sigma_x - \sigma_y)/2$ is the maximum shear stress far from the borehole in the formation. If the difference of the coupling coefficients is known, equation (22) can be used to directly compute the stress difference or maximum shear stress in the formation from the cross-dipole anisotropy analysis results. Even without knowing the value of $S_{//} - S_\perp$, the parameter combination defined in equation (22) serves directly as an important indicator of stress-related formation characteristics. There are two reasons for this. First, as it has been seen from the laboratory test results, rocks with high $S_{//} - S_\perp$ values are generally easier to deform under stress due to a higher concentration of imperfections. Therefore, under the same stress condition, these rocks are more likely to yield or fail than rocks with smaller $S_{//} - S_\perp$ values. Second, given the same coupling coefficients, a formation subject to a higher (shear) stress will encounter failure faster than one subject to a lower stress. Thus, the product of stress and the coupling coefficient difference serves as an effective indicator of impending failure of a formation interval. This indicator may find useful applications in sand control during reservoir production or in the study of borehole stability and formation mechanic properties, etc. Moreover, this indicator can be directly obtained from a cross-dipole measurement as the product of anisotropy with the squared average shear velocity {equation (22)}.

An important aspect of interpreting cross-dipole-measured anisotropy is to determine the cause of the anisotropy, because formation anisotropy can result from other sources, such as intrinsic anisotropy due to aligned microstructures and fractures, etc. It is demonstrated here that stress-induced anisotropy can be distinguished by the degree of shear-wave splitting in the monopole shear-waveforms. An acoustic monopole source induces radially polarized shear-waves that propagate along the borehole wall. If the formation surrounding the borehole is azimuthally anisotropic, as described by equations (16) and (17), the radial shear will split into two shear-waves that polarize to x- and y-directions, respectively. By refracting back to the borehole fluid, the two shear-waves are detected by a monopole receiver. The condition for the existence of the refracted shear-wave is that the velocity of the two shear-waves is greater than the borehole fluid velocity, which is referred to as fast formation situation.

The most important difference between the stress-induced anisotropy and the other types of anisotropy is that the former is characterized by strong near-borehole variations (see FIGS. 4 and 5) while the latter ones do not have these variations (i.e., they can be modeled as homogeneous across the near and far borehole regions). The near-borehole variations can be measured with a monopole shear-wave. Compared to dipole shear-waves, the monopole shear-wave has a relative shallower depth of penetration due to its higher frequency content (generally on the order of 10 kHz). Thus it can be expected that a monopole shear-wave will be significantly affected by the near-borehole shear velocity variations caused by formation stress (see FIGS. 4 and 5).

The same stress-velocity model, as used in the dipole wave simulation, is used to simulate the monopole wave propagation using the finite difference technique of Cheng et al (1995). Two cases are simulated. The first case uses the stress-velocity model theory {equations (14) and (15)} to compute the anisotropy shear moduli $C_{44}$ and $C_{66}$ distributions around the borehole. The second simulation uses a homogeneous model with constant $C_{44}$ and $C_{66}$ values equal to their respective far borehole values in the first model, the corresponding velocity values being 2,603 m/s and 2,432 m/s, respectively. In both cases, the formation and fluid compressional velocities and densities and borehole diameter are identically set to appropriate values.

Figure 7A:
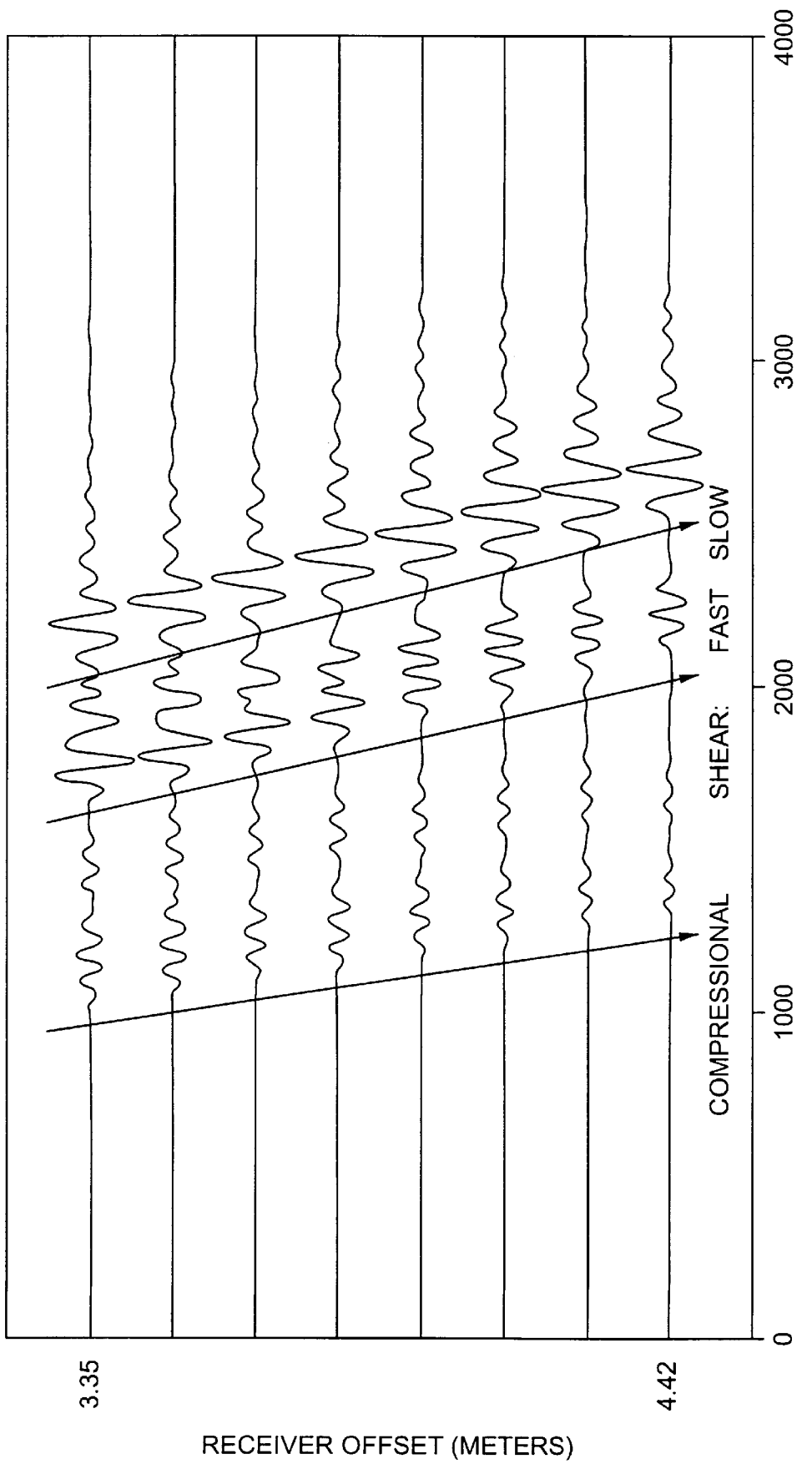
FIGS. 7A–7B show graphs of monopole shear-wave splitting due to stress-induced anisotropy versus intrinsic anisotropy as a means of distinguishing them.
Figure 7B:
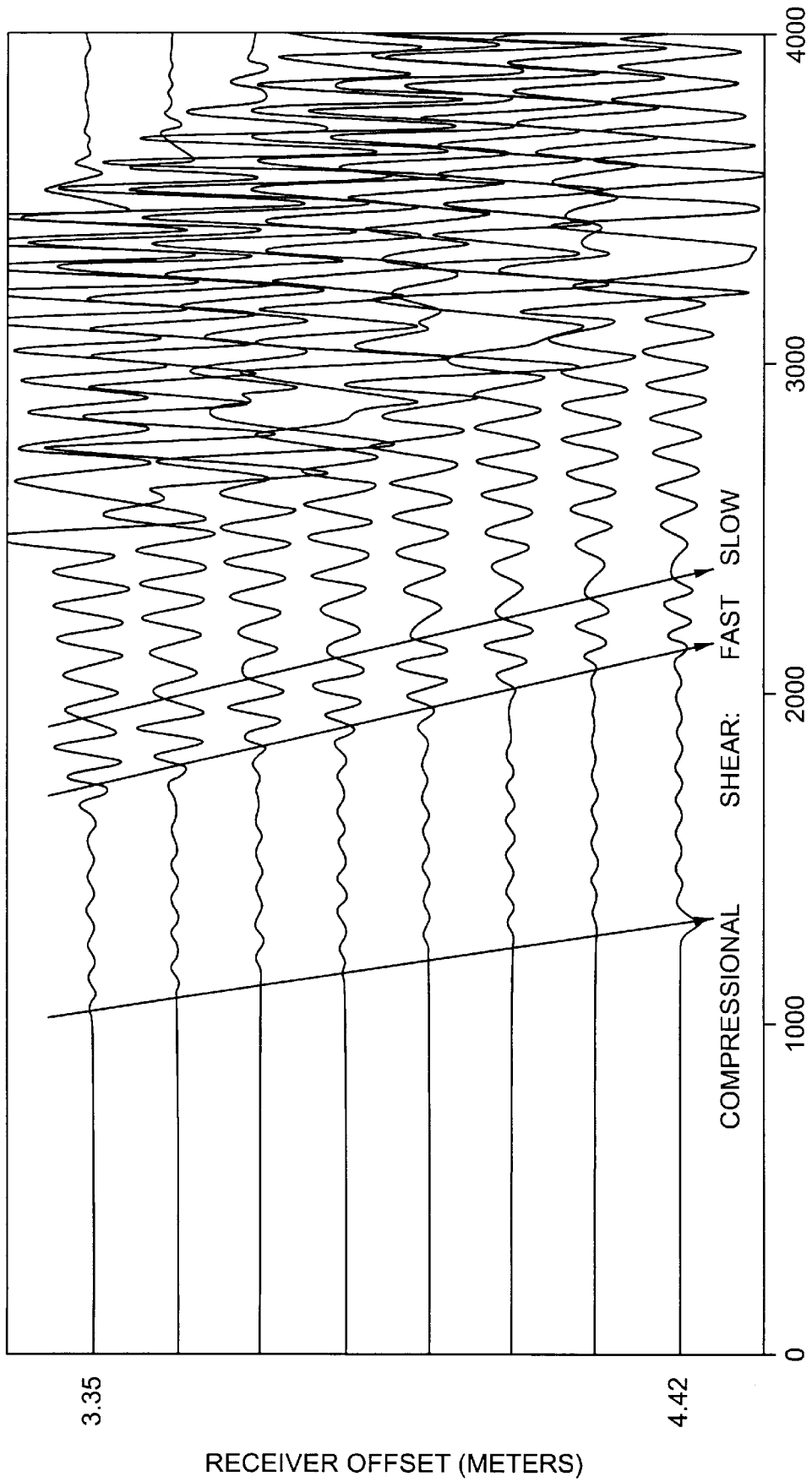

FIG. 7 shows the simulated monopole waveforms for an eight-receiver array in the borehole, with FIG. 7a corresponding to the stress-velocity model while FIG. 7b to the homogeneous model. An important feature in FIG. 7a is that the shear-wave portion of the waveforms is split into fast and slow waves. The velocity difference between them is about 15%. There is a slight splitting in the shear-waveforms for the homogeneous model result in FIG. 7b. The velocity difference is about 6%. Note that the shear velocity difference in FIG. 7a is on the same order of the near-borehole velocity variation while the difference in FIG. 7b is about the same as the shear-wave anisotropy in the homogeneous model. This clearly indicates that the significant monopole shear-wave splitting is caused by the stress-induced velocity variation in the near-borehole region. This important result allows us to distinguish stress-induced anisotropy from other sources of formation anisotropy.

Based on the above result, a method to detect stress-induced anisotropy measured by a cross-dipole tool can be developed. For this purpose it is required that the formation shear-wave velocity be substantially above the borehole fluid velocity. This way, the shear-waves and their splitting can be measured by a monopole acoustic receiver array. For a formation with significant anisotropy, as measured by the cross-dipole tool, the shear-wave data measured by the monopole receivers can be inspected. If there are two shear-waves and their splitting is significant such that their respective velocities can be determined, a velocity analysis is performed to determine the difference between the two shear velocities. If this difference is comparable with the measured anisotropy, the anisotropy is caused by factors other than stress. However, if the difference is significantly higher than the measured anisotropy, this anisotropy is then caused by formation stress. Once a stress-induced anisotropy is detected, the orientations of the maximum and minimum principal stresses are found as the fast and slow shear-wave polarization directions, respectively. The difference of the two principal stresses can be further determined and the stress-indicator values computed by applying equations (20) through (23) to the cross-dipole measurement.

A Field Data Example

Figure 8:
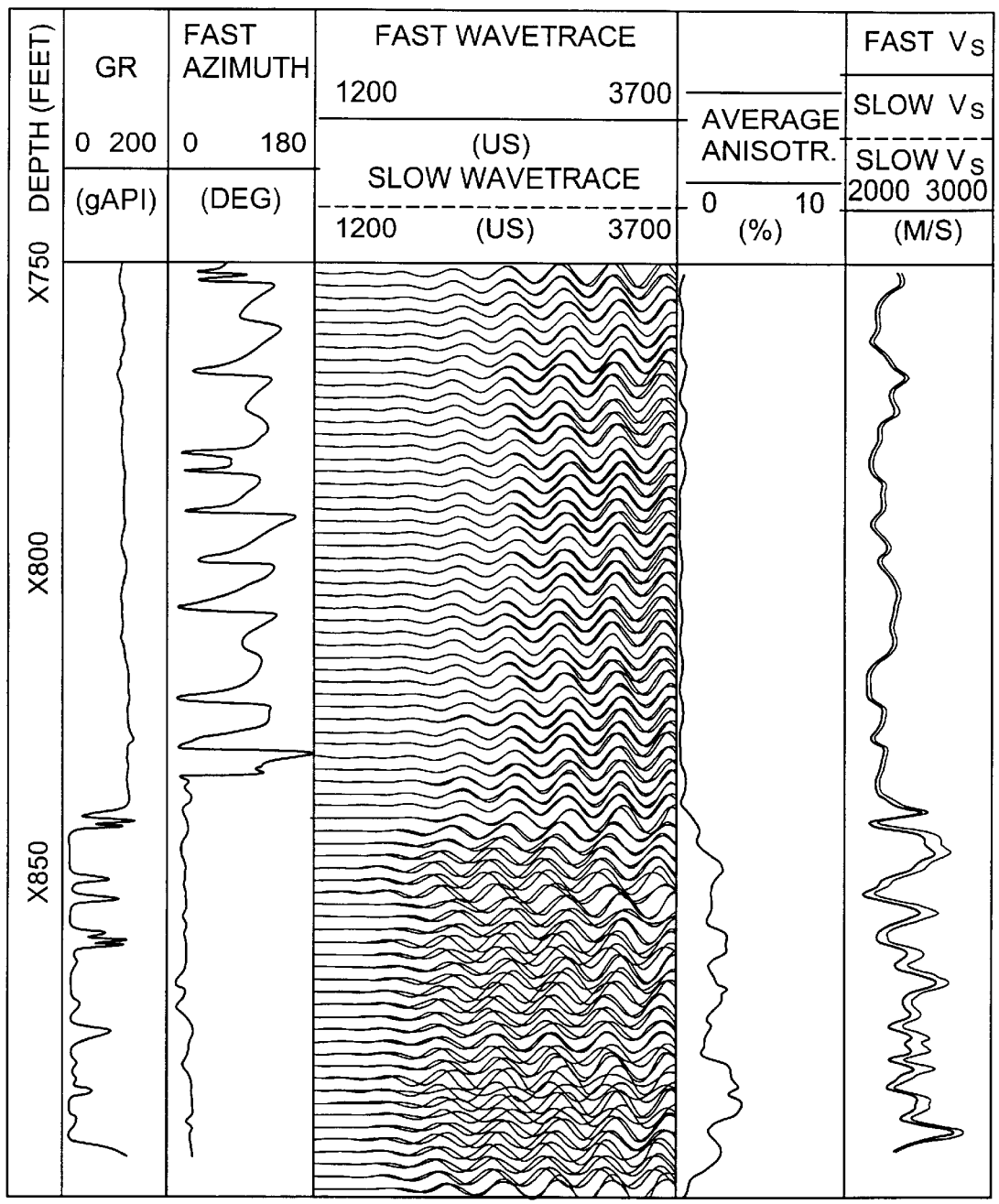
FIG. 8 shows a graph of an example of stress-induced shear-wave azimuthal anisotropy obtained from cross-dipole data analysis.

In this section, the application of the borehole stress-velocity model theory to field acoustic monopole and cross-dipole data for in-situ stress estimation is demonstrated. FIG. 8 shows the cross-dipole anisotropy analysis results for a depth segment with sand/shale formations. The upper shale formation corresponds to high gamma ray (GR) values (see track 1), while the lower sandstone formation corresponds to low GR values and is interlaced with some shale streaks. Cross-dipole-determined azimuthal anisotropy is clearly identified in the sandstone formation but almost disappears in the shale formation. The anisotropy, displayed as the shaded curve in track 4, is well supported by the splitting of fast and slow dipole shear-waves in track 3. (Note the splitting disappears in the upper shale). It is also supported by the well-defined fast shear-wave polarization azimuth displayed in track 2. In contrast, this azimuth becomes undefined in the shale formation, showing a tendency to follow the tool azimuth (the tool was spinning during logging through the entire depth).

Figure 9:
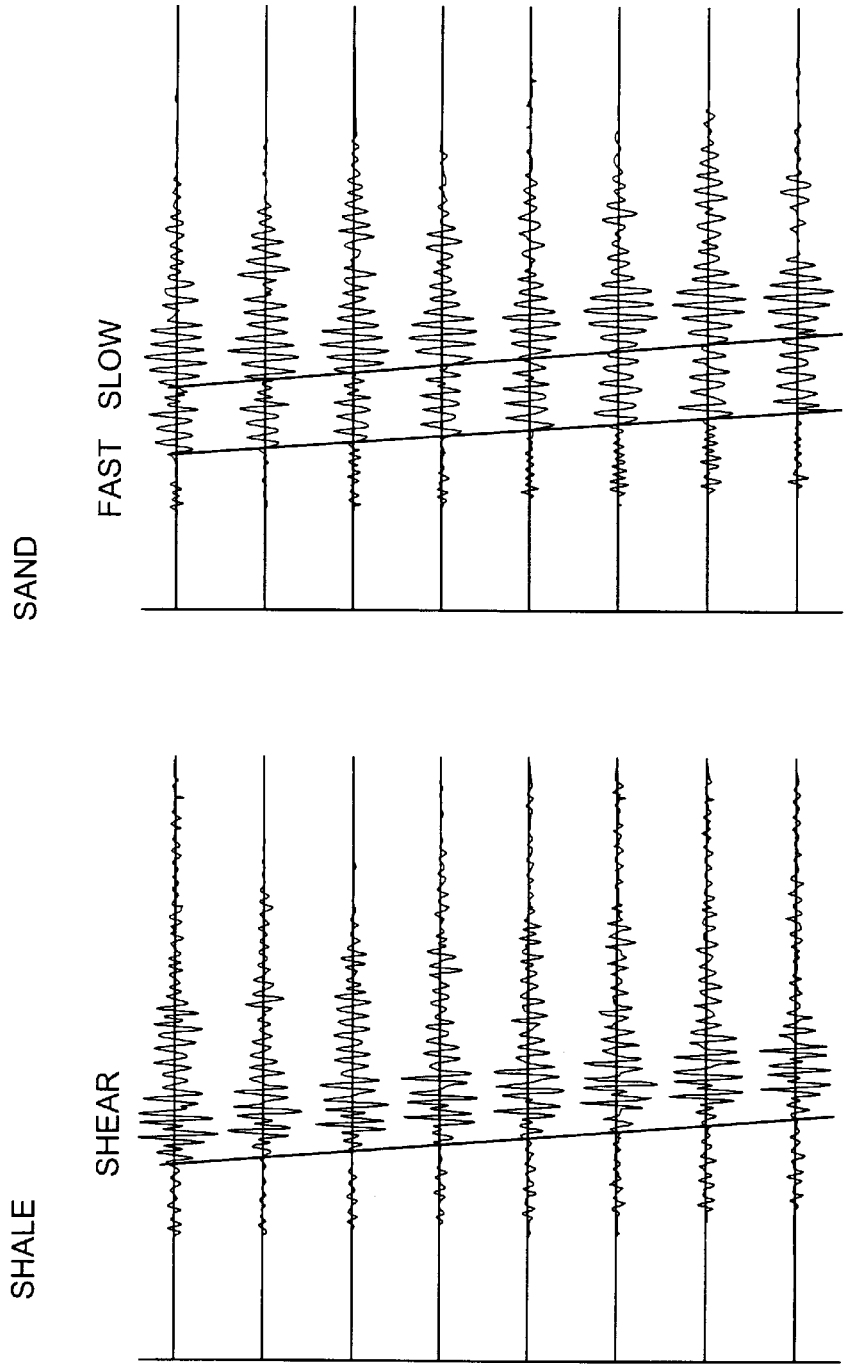
FIG. 9 shows a verification of the stress-related wave propagation theory using a field monopole acoustic logging data example.

The monopole shear-wave data observation provides a stress indication. FIG. 9 compares the monopole shear-waves logged in the shale and sand formations. In the shale formation, there is only one shear-wave mode in the waveform data. In contrast to this, there exist two shear-wave modes in the sand formation. This shear-wave splitting is the direct result of the stress-related wave propagation theory, as has been shown in the synthetic waveform example of FIG. 7a. Moreover, the velocity difference between the two shear-waves is about 10%, while the cross-dipole-measured anisotropy is about 5%. This observation agrees well with our theoretical analysis with the monopole shear-waves. Therefore it can be determined that the anisotropy is caused by formation stress. This field data example not only validates our stress-velocity theory, but also indicates the monopole shear-wave splitting as an effective means of detecting stress-induced anisotropy.

Two additional strong indicators also suggest that the observed anisotropy is caused by stress. The first is that the same fast azimuth is also observed for a massive sand body that is about 1,000 ft above the sandstone formation under study. The coincidence of the azimuth of the two sand bodies indicates that this azimuth is the direction of the maximum horizontal stress in this region. The second indicator is that the anisotropy is mainly observed in sandstone but not in shale. (Although shale is a strong transversely isotropic (TI) rock, this TI-related anisotropy can not be observed because the well is vertical). This agrees with our previously demonstrated laboratory results that stress-induced anisotropy is insignificant in shale. Similar phenomena have also been observed for many cross-dipole data sets from different regions around the world. The laboratory and field observations suggest that, in general, stress-induced anisotropy is small in shale.

Figure 10:
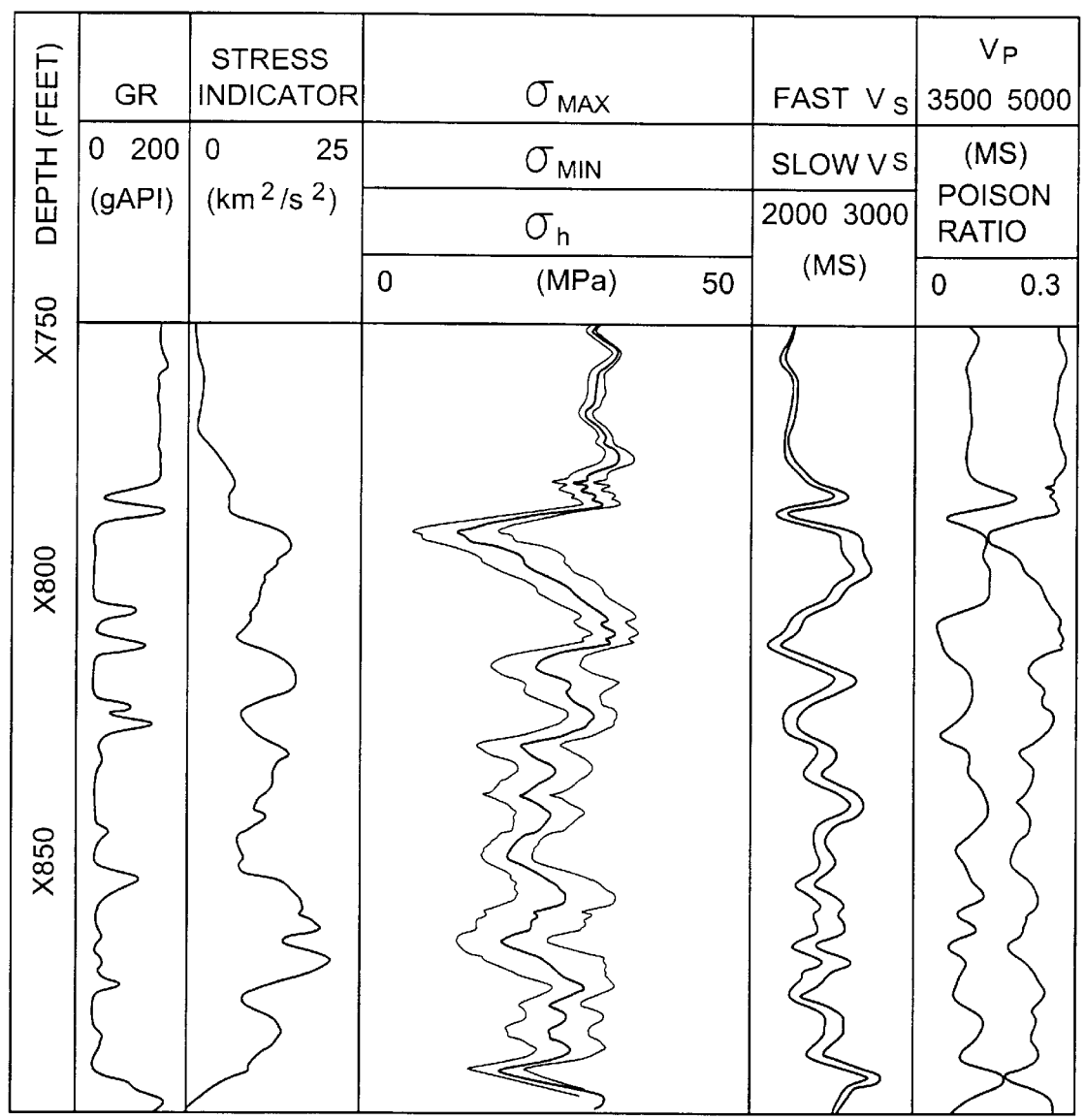
FIG. 10 shows a graph of stress estimation for a sand formation.

For a formation with stress-induced anisotropy, the above analysis results {equations (20) through (22)} can be applied to yield the results given in FIG. 10. Track 2 of this figure shows the stress indicator defined in equation (22). This curve generally shows a higher value in sand intervals and lower value across the thin shale streaks. (Note these curves have different resolutions: 3 ft for GR and 11 for the Stress Indicator.) This behavior simply demonstrates that the stress-induced shear-wave effect is significant in sand but insignificant in shale. In fact, in the upper shale formation the indicator has quite small values. Because stress cannot be estimated in the shale formation due to shale's insensitivity to stress, the results in FIG. 10 are shown mainly for the sand formation. The features of the stress indicator as exhibited in track 2 suggest it is potentially a useful tool to indicate impending formation failure or instability of a sandstone formation interval, especially in borehole stability and sand production control problems.

Estimation of the stress difference magnitude needs to know the value of the coupling coefficient difference $S_{//}-S_{\perp}$. Unfortunately, no core data were available for estimating this value from laboratory measurement using the method described previously. To demonstrate the method application, a $S_{//}-S_{\perp}$ value from the laboratory test on the sandstone sample of 18.6% porosity is taken, as shown in FIG. 2. (The porosity for the sand formation varies between 15% and 20%). This gives a value of 57,346 $m^2/s^2$MPa for $S_{//}-S_{\perp}$. Given this value, the stress difference is obtained using equation (20). To obtain the magnitude of the principal stresses, a conventional approach is used. Assuming no lateral strain and equality of the two horizontal stresses, the conventional method calculates an average horizontal stress using $$\sigma_h = \frac{v}{1-v}\sigma_v \qquad (23)$$

where v is Poisson's ration and $\sigma_v$ is the vertical overburden stress that can be estimated from the density log. A Poisson's ratio curve (track 5) is computed from the monopole compressional (track 5) and shear velocities. (For comparison, the two shear velocity curves are replotted in track 4, with the difference shaded.) Using the stress difference from equation (20) and assuming $\sigma_h$ to be the average of the two horizontal stresses, the maximum and minimum stress profiles shown in track 3 are obtained, with their difference shaded and $\sigma_h$ shown in the middle of the two curves. In addition, by averaging the fast and slow shear velocities across the sand formation shown in FIG. 10, the overall stress difference and maximum shear stress for this formation interval can be estimated. The average stress difference is 8.6 MPa and the average maximum shear stress is 4.3 MPa. These values are summarized in the table below which show average fast and slow shear velocities in sand formation.

| Formation | Depth Averaged | Vs (fast) (m/s) | Vs (slow) (m/s) | $\tau_{max}$ (MPa) | $\Delta\sigma$ (MPa) |
|---|---|---|---|---|---|
| Sand | 112 feet | 2498 | 2397 | 4.3 | 8.6 |

The average stress difference and maximum shear stress are calculated by assuming $S_{//}-S_{\perp}=57,346$ m$^2$/S$^2$MPa in equation (22).

Discussion on the Merits and Other Aspects of the Present Teachings

The merit of the model theory of this study is that it presents a simple and straightforward link between formation stress difference and resulting shear velocity changes and anisotropy. This link is simply a scaling parameter $S_{//}-S_{\perp}$, the parallel and perpendicular stress-velocity coupling coefficient difference. The validity of the estimated stress values depends on the validity of this parameter value and the accuracy of the measured velocity values. These two factors are discussed in this section.

The present teachings have demonstrated that the coupling coefficients $S_{//}$ and $S_{\perp}$ can be determined in the laboratory by measuring rock samples from the formation of interest. Although stress in general will affect the shear velocity of porous rocks, the values of $S_{//}$ and $S_{\perp}$ depend on rock type (lithology) as well as porosity and crack density, etc. Therefore, one should test a number of samples to obtain an average $S_{//}-S_{\perp}$ value that is representative of the formation of interest. In addition, instead of a uniaxial test, one would probably perform a triaxial test to simulate the in-situ stress conditions. For example, one can apply stress in vertical and two horizontal directions, then measure the vertical shear velocity with polarizations pointing to the two horizontal stress directions, while varying one of the two horizontal stresses in an appropriate range. The rock sample should also be saturated corresponding to the in-situ condition. The $S_{//}$ and $S_{\perp}$ values determined this way should correspond to in-situ conditions.

Another important issue is that scale effect, which is known to exist for mechanical properties like moduli and strength, may also exist for $S_{//}$ and $S_{\perp}$. The scale effect is caused by heterogeneities of different sizes when different volumes of rock are measured. In the laboratory, microcracks, pores, etc. are believed to be the cause of the stress-induced anisotropy (see Nur, A., "Effects of Stress on Velocity Anisotropy in Rocks with Cracks," Jour. of Geoph. Res., 76, 2022–2034 (1971)). In the in-situ situation, there may exist heterogeneities of different sizes (e.g., fissures, vugs, fractures, etc.). Thus the laboratory measured $S_{//}-S_{\perp}$ value may be different from its in-situ value. In this scenario, determining $S_{//}-S_{\perp}$ from in-situ measurement is more appropriate. From equation (20), the equation $$S_{//}-S_{\perp} = \frac{V_x^2 - V_y^2}{\sigma_x - \sigma_y} \qquad (24)$$

is obtained. Assuming the value of $V_x$ and $V_y$ from cross-dipole logging and the stress values from a microfracture test or leakoff observation have been obtained, the $S_{//}-S_{\perp}$ value can be determined using equation (24). The estimated, or calibrated, $S_{//}-S_{\perp}$ value can then be applied to formations with similar lithology to estimate stress magnitude.

The accuracy of shear velocity measurements is another important factor for the stress estimation because the stress difference is calculated from the relative difference between these velocities {equations (20) through (22)}. The validity of the stress estimation largely depends on the quality of the dipole (cross-dipole) acoustic data. As shown from the modeling results in FIG. 5, to measure the shear velocities relating to the virgin formation stress, deep acoustic penetration is necessary. This requires that the dipole tool operate in the lowest possible frequency range. Low-frequency dipole logging also makes the dispersion correction insignificant. Besides the good quality of dipole data, an effective anisotropy analysis is essential. Tang and Chunduru (1998) presented a robust array processing method for obtaining the anisotropy using the relative time delay between fast and slow dipole shear-waves. The obtained anisotropy, especially the average anisotropy from transmitter to receiver, has been shown to be a quite accurate estimate. For example, the Tang and Chunduru (1998) analysis has been applied to data from several repeat passes of a cross-dipole tool and to data from the same formation logged by different tools, all results showing almost the same average anisotropy estimate. An example using repeat passes is given by Patterson and Shell (1997). These case studies show that the stress difference determination using only the cross-dipole measurement {equation (20)} should be reliable. Stress detection using monopole shear-wave splitting is reliable when the stress-induced velocity variation is significantly higher than the measured anisotropy. In some cases, the near borehole shear velocity may be altered by effects such as borehole fluid invasion, rock failure, drilling damage, etc., especially in formations with low shear rigidity. Therefore, stress detection using monopole shear-waves should mainly be used for hard rocks.

Well Logging Apparatus

Figure 11:
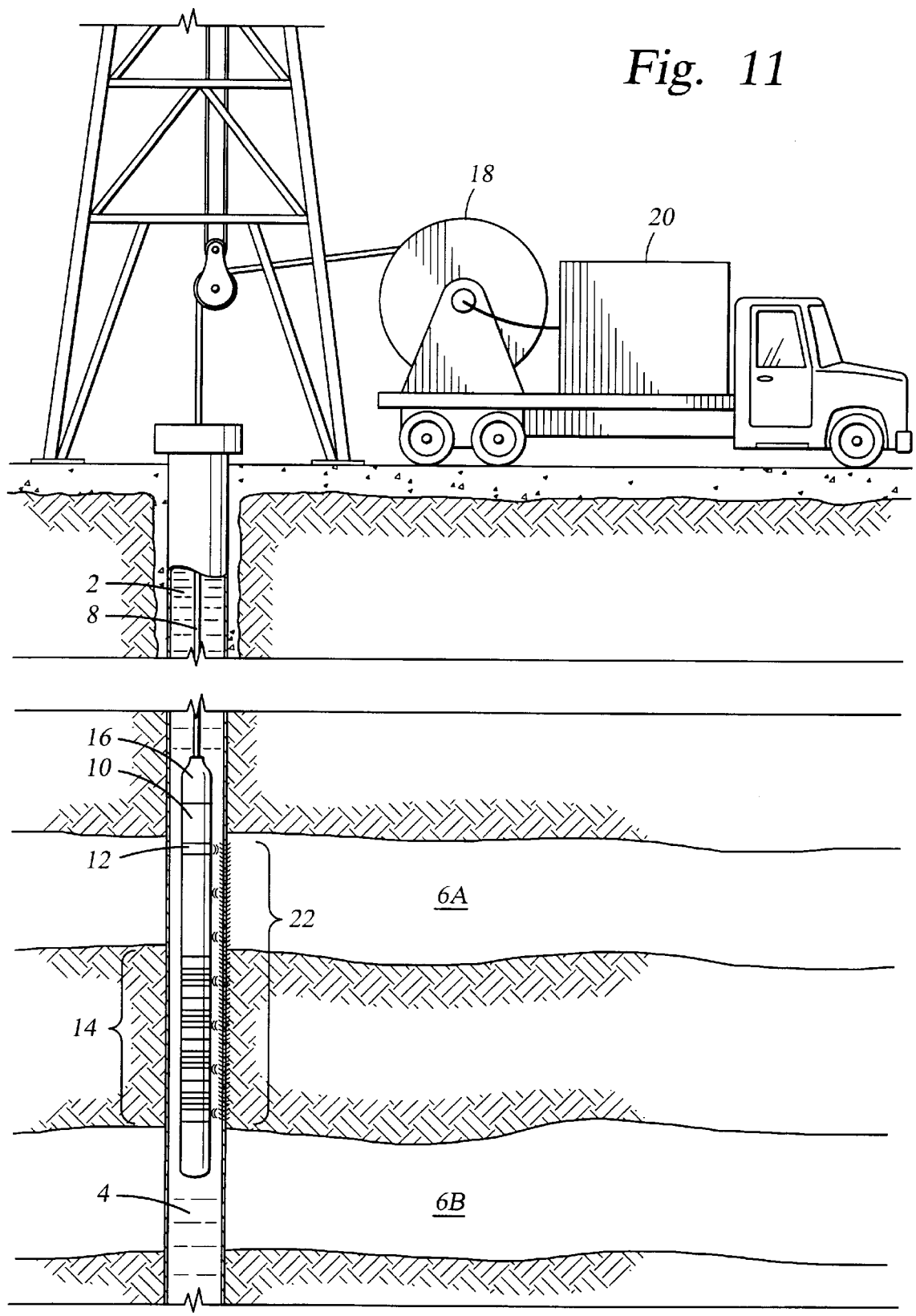
FIG. 11 shows a diagram of a well logging apparatus suitable for performing the presently disclosed methods.

A well logging apparatus suitable for performing the monopole and cross-dipole measurements disclosed herein is depicted in FIG. 11. An acoustic array wellbore logging tool, shown generally at 10, is attached to one end of an armored electrical cable 8. The cable 8 is extended into a wellbore 2 penetrating earth formations, shown generally at 6A and 6B. A winch 18, or similar device known to those skilled in the art, extends the cable 8 into the wellbore 2. the well bore 2 is typically filled with a liquid 4 which is known to those skilled in the art as "drilling mud", or similar fluid. the liquid 4 enables transmission of acoustic energy from the tool 10 outwardly to the wall of the wellbore 2.

Acoustic monopole and dipole transmitters are disposed on the tool 10 and shown generally at 12. These transmitters 12 periodically emit acoustic energy pulses shown generally at 22. The pulses 22 typically travel radially outwardly from the transmitter 12 through the fluid 4 in the wellbore 2, until they strike the wall of the wellbore 2. The pulses 22 then typically travel along the wellbore 4 wall. Some of the acoustic energy returns to the fluid 4 in the wellbore 2 and can be detected by a plurality of monopole and dipole receivers shown generally at 14 and disposed at axially spaced apart locations from the transmitter 12. The receivers 14 generate electrical signals corresponding to the amplitude of the acoustic energy reaching the receivers 14.

The tool 10 typically includes signal processing electronics, shown generally at 16, which can digitize the signals from the receivers 14 and impart the digitized signals to the cable 8. signals imparted to the cable 8 can be transmitted to a surface electronics unit 20.

Figure 12:
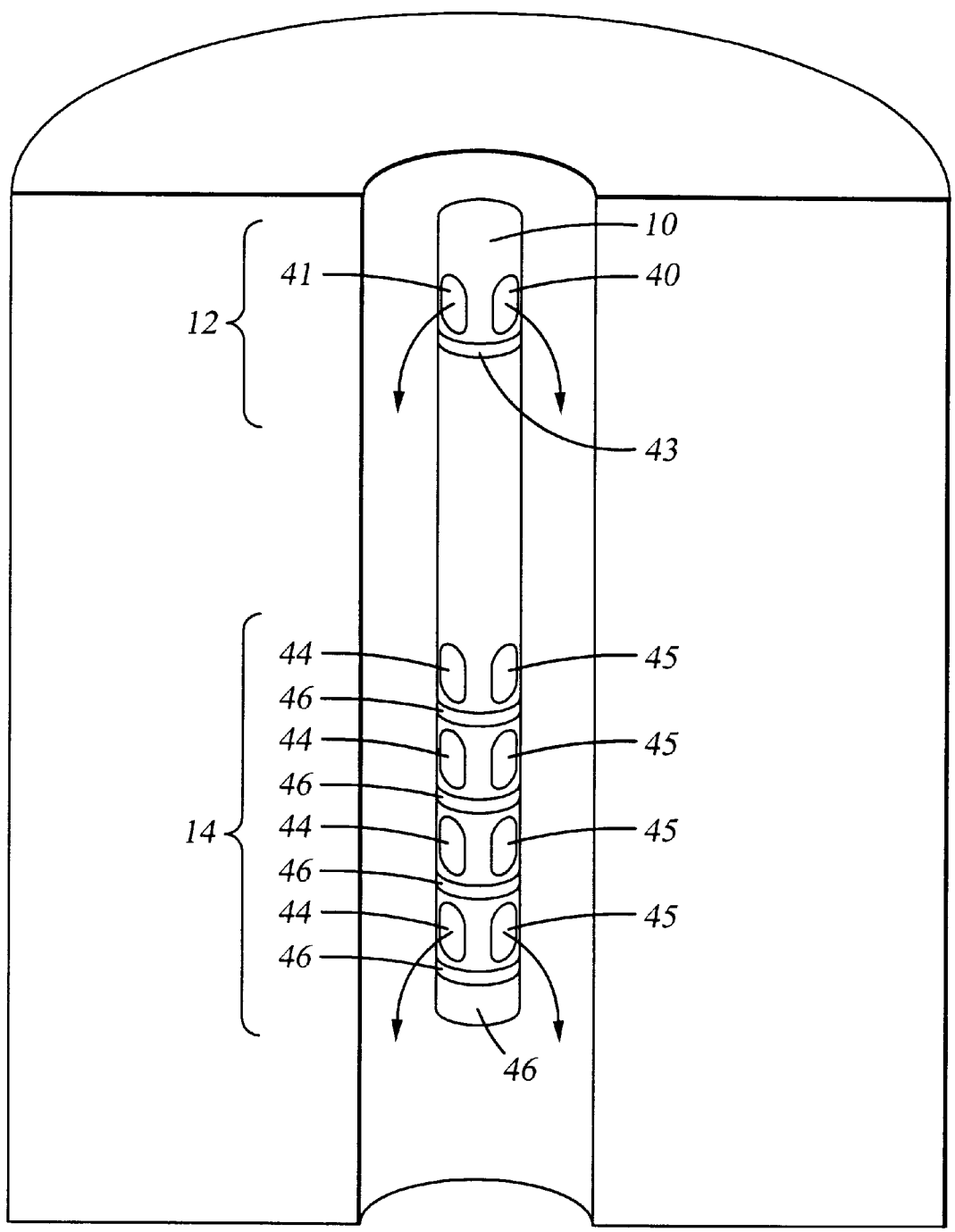
FIG. 12 shows a detailed diagram of an orientation of the monopole and dipole transmitters and receiver arrays in a well logging apparatus suitable for performing the presently disclosed methods.

The orientation of the transmitters 12 and receivers 14 can be seen by referring to FIG. 12. A first dipole transmitter 41, a second dipole transmitter 40, and a monopole transmitter 43 are disposed in the tool 10. The first and second dipole transmitters 41 and 40 are oriented at right angles to each other. Axially away from the transmitters 12 are the receiver arrays 14. A first dipole receiver array 44 and a second dipole receiver array 45 are disposed in the tool 10 and oriented at right angles from each other. A monopole receiver array 46 is also disposed in the tool 10. Although shown with transmitters 12 at the top of the tool 10 and receivers 14 at the bottom of the tool 10, this is not necessary. The configuration can be reversed and still obtain equivalent information.

According to a disclosed class of innovative embodiments, there is provided: a method for determining information about geologic formations, comprising: taking an acoustic monopole velocity measurement; taking an acoustic cross-dipole velocity measurement; and combining said monopole and said cross-dipole velocity measurements to determine a borehole stress field around a borehole.

According to another disclosed class of innovative embodiments, there is provided: a method for determining geologic formation information, comprising: generating two dipole shear-waves said shear-waves being polarized differently from each other; measuring a cross-dipole velocity difference; generating a radially polarized monopole shear-wave; determining whether said radially polarized monopole shear-wave has been split into a fast shear-wave and a slow shear-wave; if said monopole shear-wave has been split, measuring a velocity difference between said fast shear-wave and said slow shear-wave; and comparing said velocity difference with said cross-dipole velocity difference to determine anisotropy information about a geologic formation near a borehole.

According to another disclosed class of innovative embodiments, there is provided: a method for determining stress-velocity coupling coefficients, comprising: mounting transmitter transducers and receiver transducers at opposite sides of a sample, said transmitter and receiver transducers facing in the z-direction wherein the z-direction points through the sample from said transmitter to said receiver; measuring unstressed shear-wave velocities for unstressed shear-waves polarized in the x- and y-directions wherein said x- and y-directions are orthogonal to each other and are orthogonal to said z-direction; applying a stress to the sample; measuring stressed shear-wave velocities for stressed shear-waves polarized in the x- and y-directions; repeatedly increasing the magnitude of said stress to various values and measuring stress shear-wave velocities for stressed shear-waves polarized in the x- and y-directions at each value; determining a difference between the squares of said stressed shear-wave velocities and the squares of said unstressed shear-wave velocities at various stress magnitude values to create data points; fitting a line through said data points; using the slope of said line to determine stress-velocity coupling coefficients.

According to another disclosed class of innovative embodiments, there is provided: a method for determining stress-velocity coupling coefficients through field measurement calibration, comprising: determining x- and y-direction stress components where said x- and y-directions are orthogonal to each other and are orthogonal to an axial line passing through a borehole; performing a cross-dipole measurement; determining a dipole shear-wave polarized in the x-direction; determining a dipole shear-wave polarized in the y-direction; determining velocities for said shear-waves; and relating said x- and y-direction stress components, and said shear-wave velocities to each other to determine stress-velocity coupling coefficients.

According to another disclosed class of innovative embodiments, there is provided: a method for determining geologic formation information, comprising: measuring a stress-induced velocity difference around and near a borehole; measuring an acoustic dipole to measure a velocity change away from said borehole; measuring a borehole pressure; and relating said borehole pressure to said velocity difference and said velocity change to determine information about a rock formation.

According to another disclosed class of innovative embodiments, there is provided: a method for determining impending rock failure, comprising: determining a stress-velocity coupling coefficient for a stress that is substantially parallel to a shear-wave polarization direction; determining a stress-velocity coupling coefficient for a stress that is substantially orthogonal to said shear-wave polarization direction; determining two substantially orthogonal principal stresses which are also substantially orthogonal to a vertical direction; multiplying the difference between said stress-velocity coupling coefficients with the difference between said two substantially orthogonal principal stresses to determine a stress indicator; and using said stress indicator to determine impending rock failure.

According to another disclosed class of innovative embodiments, there is provided: a method for determining impending rock failure, comprising: taking a cross-dipole measurement; determining a fast velocity for a shear-wave that is polarized substantially parallel to a maximum stress direction; determining a slow velocity for a shear-wave that is polarized substantially perpendicular to a minimum stress direction; calculating an average shear velocity using said fast and said slow velocities; calculating a relative difference between said fast and said slow velocities; multiplying half of said relative difference with the square of said average shear velocity to determine a stress indicator; and using said stress indicator to determine impending rock failure.

According to another disclosed class of innovative embodiments, there is provided: a method for determining geologic formation information, comprising: transmitting a radially polarized monopole shear-wave which propagates along a borehole; taking an acoustic cross-dipole measurement and determining a fast dipole shear-wave velocity and a slow dipole shear-wave velocity; determining a cross-dipole velocity difference between said fast and slow dipole shear-waves from said cross-dipole measurement; determining said fast dipole shear-wave polarization direction; determining whether said monopole shear-wave has been split into a fast monopole shear-wave and a slow monopole shear-wave; if so, measuring a monopole velocity difference between said fast and slow monopole shear-waves; comparing said monopole velocity difference with said cross-dipole velocity difference; determining the amount of stress-induced anisotropy in a geologic formation as said cross-dipole velocity difference if said monopole velocity difference is substantially greater than said cross-dipole velocity difference; using said fast dipole shear-wave polarization direction to determine a maximum stress orientation of said geologic formation; combining said fast and slow dipole shear-wave velocities with said cross-dipole velocity difference to determine a maximum shear stress magnitude in said geologic formation.

Conclusions

The teachings of the present application provide a simple but powerful phenomenological model theory that relates borehole acoustic measurements to the formation stress field. The key in deriving this theory is using the linear stress-velocity relation and decomposing the stress field into azimuthally isotropic and anisotropic components. The power of the theory is its ability to model rather complicated borehole acoustic/formation stress interactions, which lays a solid foundation for determining the stress field from cross-dipole and monopole measurements. The prediction of the theory, i.e., shear-wave splitting on both monopole and dipole shear-waves, is validated by field observations. In particular, the monopole shear-wave splitting proves to be an effective means for detecting stress-induced anisotropy. The simplicity of the theory lies in the fact that only one essential parameter, the parallel and perpendicular coupling coefficient difference, is needed to determine the formation stress difference. This parameter can be either measured from laboratory testing of rock samples, or calibrated from in-situ measurement results.

Application of the results of this study to field data demonstrates the potential of the model theory for in-situ stress estimation from borehole acoustic monopole and cross-dipole data. In particular, the theory uses the cross-dipole anisotropy measurement results to give an indicator relating to formation shear stress, which may be a useful tool for sand control and borehole instability studies. Furthermore, using both laboratory and field results, this study shows that the stress-induced anisotropy is generally insignificant in shale formations, which provides important information for interpreting cross-dipole anisotropy results in sand/shale formations.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. Although the method of determining the stress-velocity coupling coefficients in the laboratory has been described using a uniaxial applied stress, the same techniques can be applied having a biaxial or triaxial applied stress with appropriate modifications to the equations as will be obvious to those skilled in the art. Although the novel teachings herein have been described primarily in the context of petroleum exploration, other uses and contexts will be readily apparent to those skilled in the art. An example of another context in which the present teachings would have application is in mining engineering.

What is claimed is:

1. A method for determining information about geologic formations, comprising:

taking an acoustic monopole velocity measurement;

taking an acoustic cross-dipole velocity measurement; and combining said monopole and said cross-dipole velocity measurements to determine a borehole stress field around a borehole.

2. The method of claim 1, wherein said acoustic monopole is an acoustic shear-wave.

3. The method of claim 1, wherein said acoustic cross-dipole velocity measurement measures the velocity of two acoustic dipole shear-waves polarized in different directions.

4. A method for determining geologic formation information, comprising:

generating two dipole shear-waves said shear-waves being polarized differently from each other;

measuring a cross-dipole velocity difference;

generating a radially polarized monopole shear-wave;

determining whether said radially polarized monopole shear-wave has been split into a fast shear-wave and a slow shear-wave;

if said monopole shear-wave has been split, measuring a velocity difference between said fast shear-wave and said slow shear-wave; and comparing said velocity difference with said cross-dipole velocity difference to determine information about a geologic formation near a borehole.

5. The method of claim 4, wherein said comparing step determines information about a cause of anisotropy.

6. A method for determining stress-velocity coupling coefficients, comprising:

mounting transmitter transducers and receiver transducers at opposite sides of a sample, said transmitter and receiver transducers facing in the z-direction wherein the z-direction points through the sample from said transmitter to said receiver;

measuring unstressed shear-wave velocities for unstressed shear-waves polarized in the x- and y-directions wherein said x- and y-directions are orthogonal to each other and are orthogonal to said z-direction;

applying a stress to the sample;

measuring stressed shear-wave velocities for stressed shear-waves polarized in the x- and y-directions;

repeatedly increasing the magnitude of said stress to various values and measuring stress shear-wave velocities for stressed shear-waves polarized in the x- and y-directions at each value;

determining a difference between the squares of said stressed shear-wave velocities and the squares of said unstressed shear-wave velocities at various stress magnitude values to create data points;

fitting a line through said data points;

using the slope of said line to determine stress-velocity coupling coefficients.

7. The method of claim 6, wherein said stress is a uniaxial stress applied in the x-direction.

8. The method of claim 6, wherein said stress is a biaxial stress applied in the x-direction and the y-direction.

9. The method of claim 6, wherein said stress is a triaxial stress applied in the x-direction, the y-direction, and the z-direction.

10. A method for determining stress-velocity coupling coefficients through field measurement calibration, comprising:
   determining x- and y-direction stress components where said x- and y-directions are orthogonal to each other and are orthogonal to an axial line passing through a borehole;
   performing a cross-dipole measurement;
   determining a dipole shear-wave polarized in the x-direction;
   determining a dipole shear-wave polarized in the y-direction;
   determining velocities for said shear-waves; and
   relating said x- and y-direction stress components, and said shear-wave velocities to each other to determine stress-velocity coupling coefficients.

11. The method of claim 10, wherein said axial line is a vertical line.

12. The method of claim 10, wherein said axial line is not a vertical line.

13. A method for determining geologic formation information, comprising:
   measuring a stress-induced velocity difference around and near a borehole;
   using an acoustic dipole device to measure a velocity change away from said borehole;
   measuring a borehole pressure; and
   relating said borehole pressure to said velocity difference and said velocity change to determine information about a rock formation.

14. The method of claim 13, wherein said relating step determines information about stress-induced anisotropy of the rock formation.

15. The method of claim 13, wherein said relating step determines information about intrinsic anisotropy of the rock formation.

16. A method for determining impending rock failure, comprising:
   determining a stress-velocity coupling coefficient for a stress that is substantially parallel to a shear-wave polarization direction;
   determining a stress-velocity coupling coefficient for a stress that is substantially orthogonal to said shear-wave polarization direction;
   determining two substantially orthogonal principal stresses which are also substantially orthogonal to a vertical direction;
   multiplying the difference between said stress-velocity coupling coefficients with the difference between said two substantially orthogonal principal stresses to determine a stress indicator; and
   using said stress indicator to determine impending rock failure.

17. A method for determining impending rock failure, comprising:
   taking a cross-dipole measurement;
   determining a fast velocity for a shear-wave that is polarized substantially parallel to a maximum stress direction;
   determining a slow velocity for a shear-wave that is polarized substantially perpendicular to a minimum stress direction;
   calculating an average shear velocity using said fast and said slow velocities;
   calculating a relative difference between said fast and said slow velocities;
   multiplying half of said relative difference with the square of said average shear velocity to determine a stress indicator; and
   using said stress indicator to determine impending rock failure.

18. A method for determining geologic formation information, comprising:
   transmitting a radially polarized monopole shear-wave which propagates along a borehole;
   taking an acoustic cross-dipole measurement and determining a fast dipole shear-wave velocity and a slow dipole shear-wave velocity;
   determining a cross-dipole velocity difference between said fast and slow dipole shear-waves from said cross-dipole measurement;
   determining said fast dipole shear-wave polarization direction;
   determining whether said monopole shear-wave has been split into a fast monopole shear-wave and a slow monopole shear-wave;
   if so, measuring a monopole velocity difference between said fast and slow monopole shear-waves;
   comparing said monopole velocity difference with said cross-dipole velocity difference;
   determining the amount of stress-induced anisotropy in a geologic formation as said cross-dipole velocity difference if said monopole velocity difference is substantially greater than said cross-dipole velocity difference;
   using said fast dipole shear-wave polarization direction to determine a maximum stress orientation of said geologic formation;
   combining said fast and slow dipole shear-wave velocities with said cross-dipole velocity difference to determine a maximum shear stress magnitude in said geologic formation.

19. A method for determining information about geologic formations in the vicinity of a borehole, comprising:
   measuring in the borehole a first shear wave anisotropy for shear waves traveling parallel to the borehole at a first frequency;
   measuring in the borehole a second shear wave anisotropy for shear waves traveling parallel to the borehole at a second frequency, said second frequency being different from said first frequency; and
   determining a stress field around the borehole by comparing the first shear wave anisotropy and the second shear wave anisotropy.

20. The method of claim 19 wherein the first frequency is less than 5 kHz and the second frequency is greater than 8 kHz.

21. The method of claim 19 wherein the measurement of the first shear wave anisotropy is performed using a monopole source and the measurement of the second shear wave anisotropy is performed using a dipole source.

* * * * *